Nov. 18, 1969    N. T. KEHOE ETAL    3,479,238
APPARATUS AND METHOD FOR SUPPLYING SHEET MATERIALS
AND BEADS TO AND ASSEMBLING THE SAME
ON A TIRE BUILDING DRUM
Filed Jan. 8, 1964    17 Sheets-Sheet 1

INVENTORS.
NORMAN T. KEHOE
ELWOOD A. STIEGLER
BY
Jack Rosin
ATTORNEY

Nov. 18, 1969  N. T. KEHOE ETAL  3,479,238
APPARATUS AND METHOD FOR SUPPLYING SHEET MATERIALS
AND BEADS TO AND ASSEMBLING THE SAME
ON A TIRE BUILDING DRUM
Filed Jan. 8, 1964  17 Sheets-Sheet 2
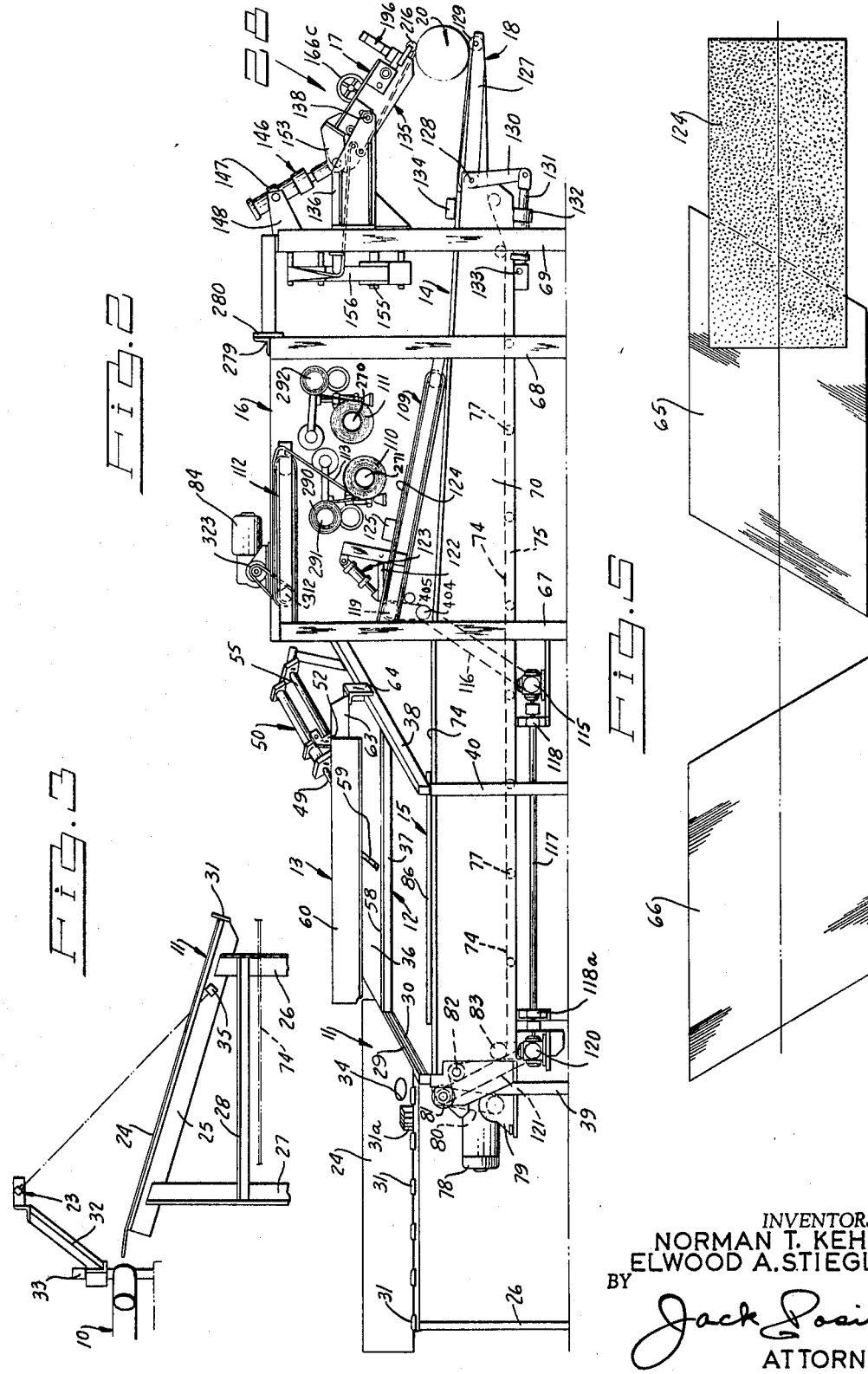
INVENTORS.
NORMAN T. KEHOE
ELWOOD A. STIEGLER
BY
Jack Posin
ATTORNEY

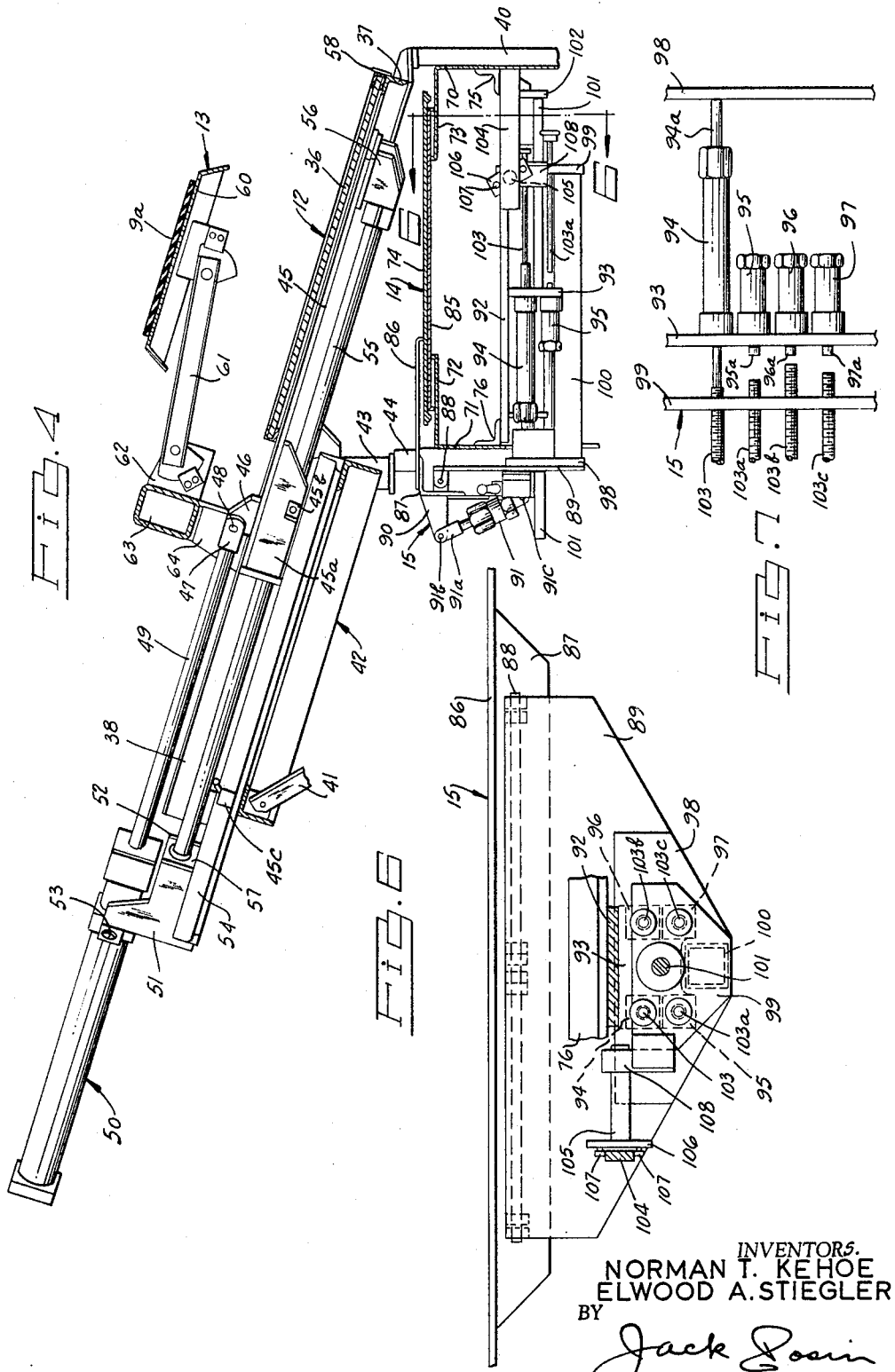

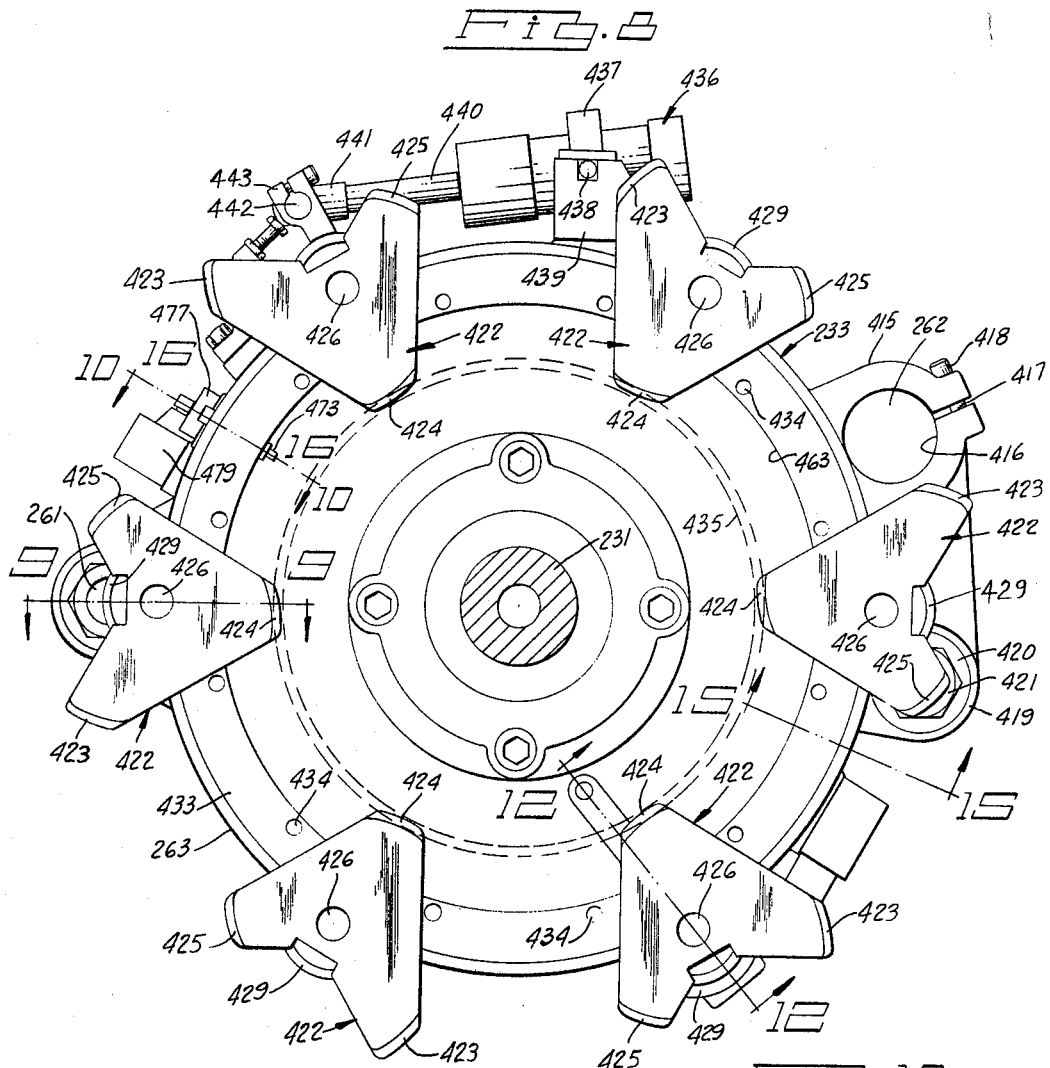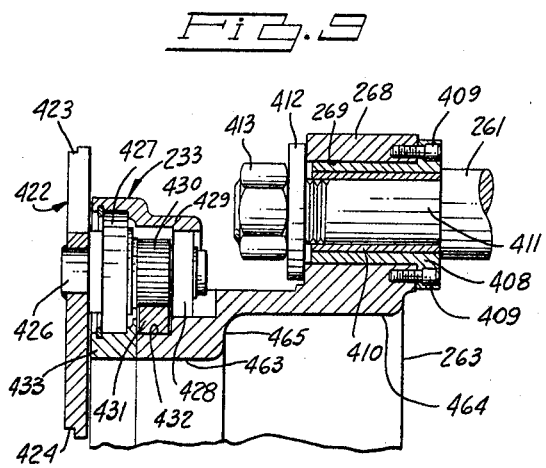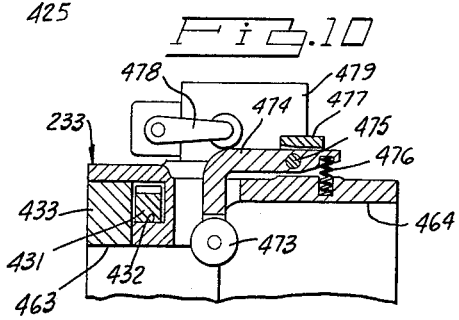

Nov. 18, 1969  N. T. KEHOE ET AL  3,479,238
APPARATUS AND METHOD FOR SUPPLYING SHEET MATERIALS
AND BEADS TO AND ASSEMBLING THE SAME
ON A TIRE BUILDING DRUM
Filed Jan. 8, 1964  17 Sheets-Sheet 5
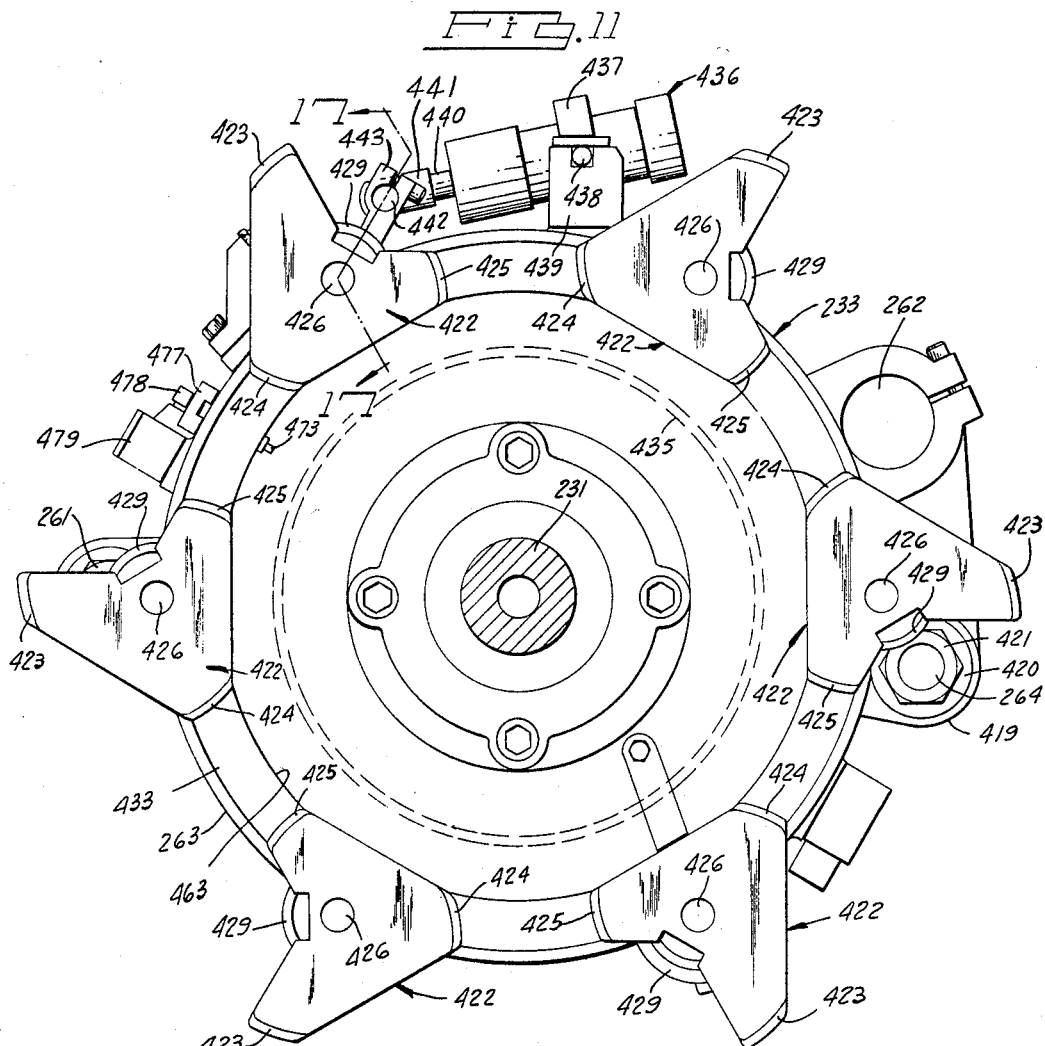
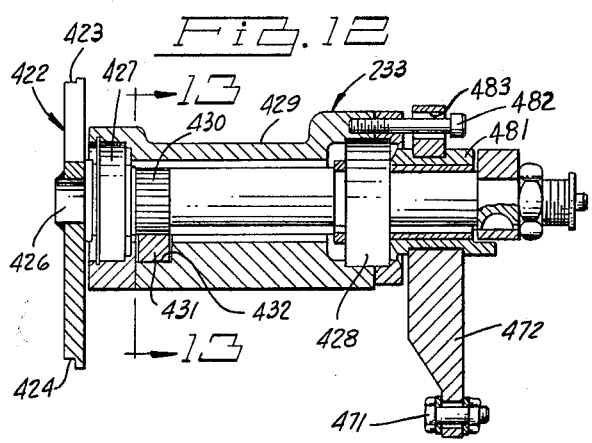
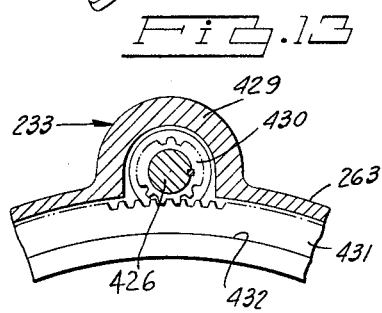
INVENTORS.
NORMAN T. KEHOE
ELWOOD A. STIEGLER
BY Jack Rosin
ATTORNEY

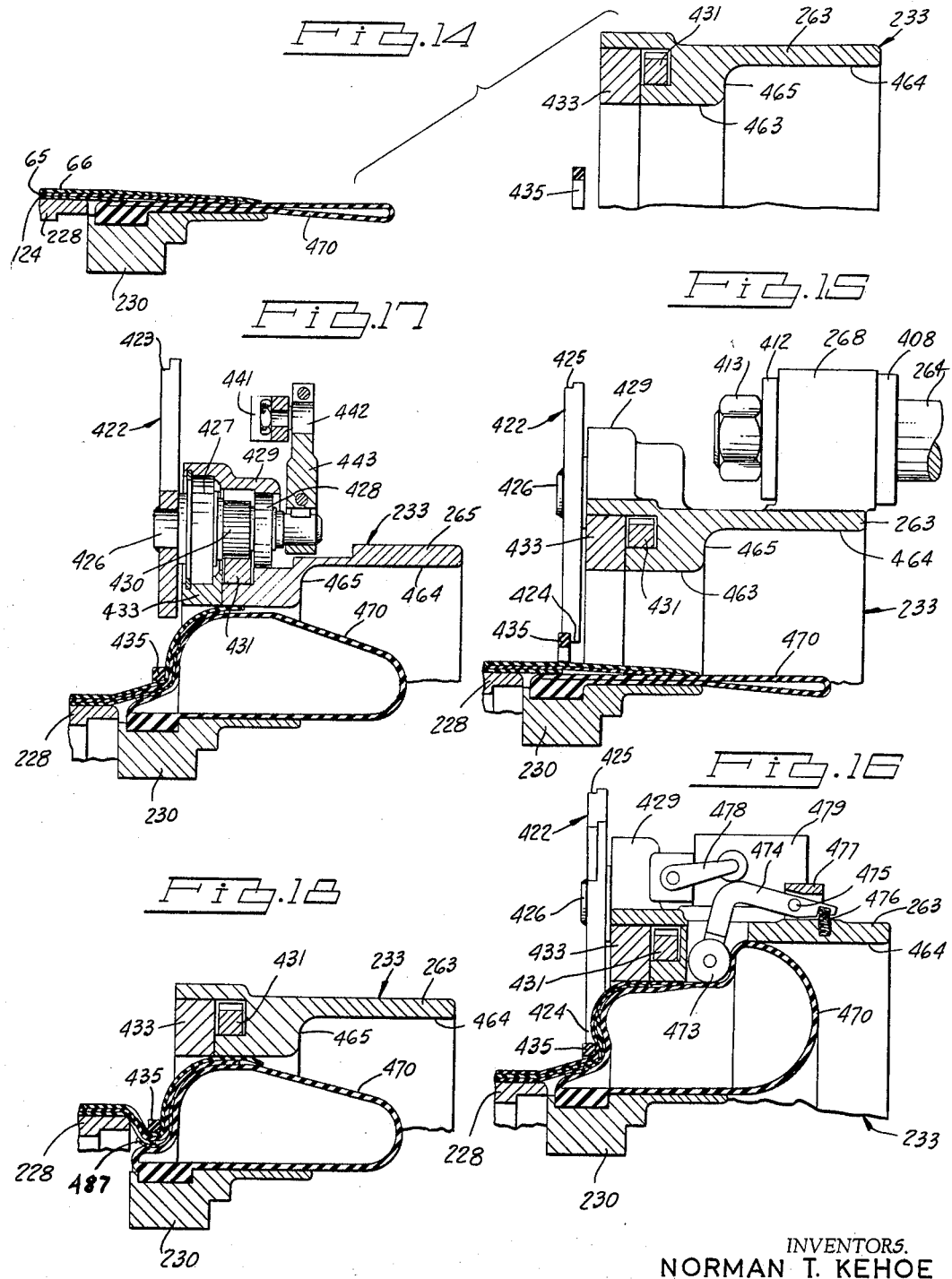

INVENTORS.
NORMAN T. KEHOE
ELWOOD A. STIEGLER
BY Jack Rosin
ATTORNEY

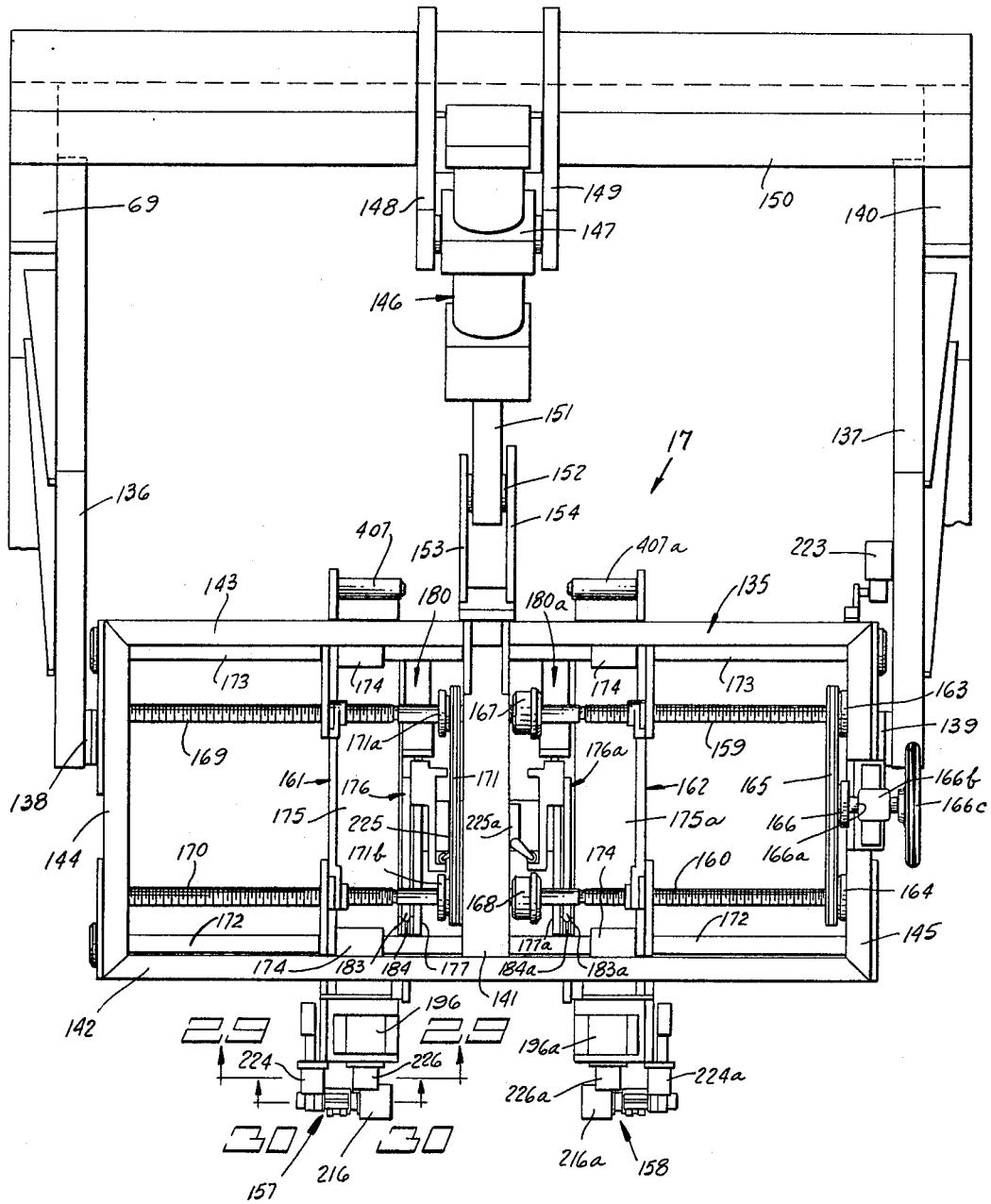

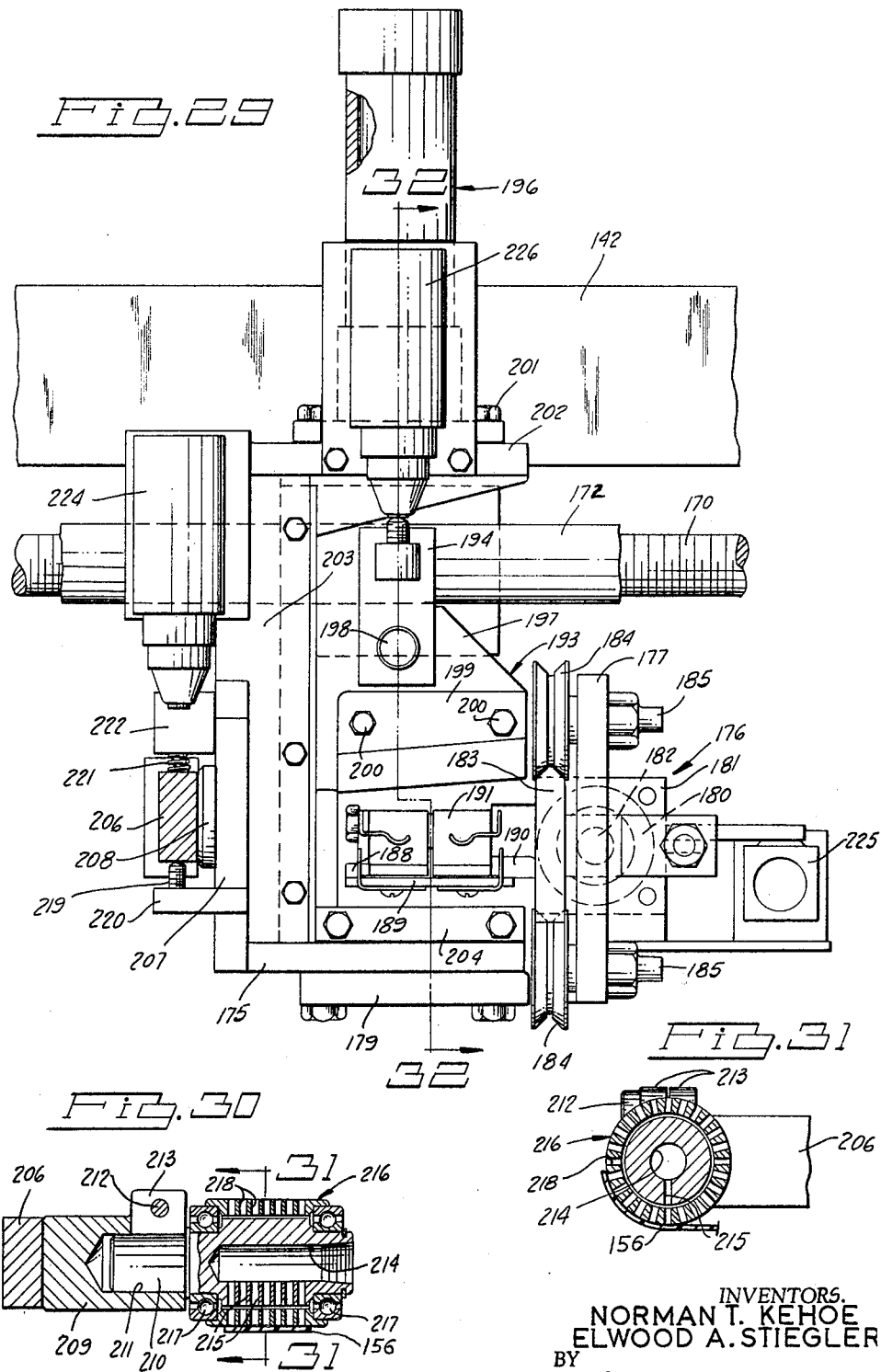

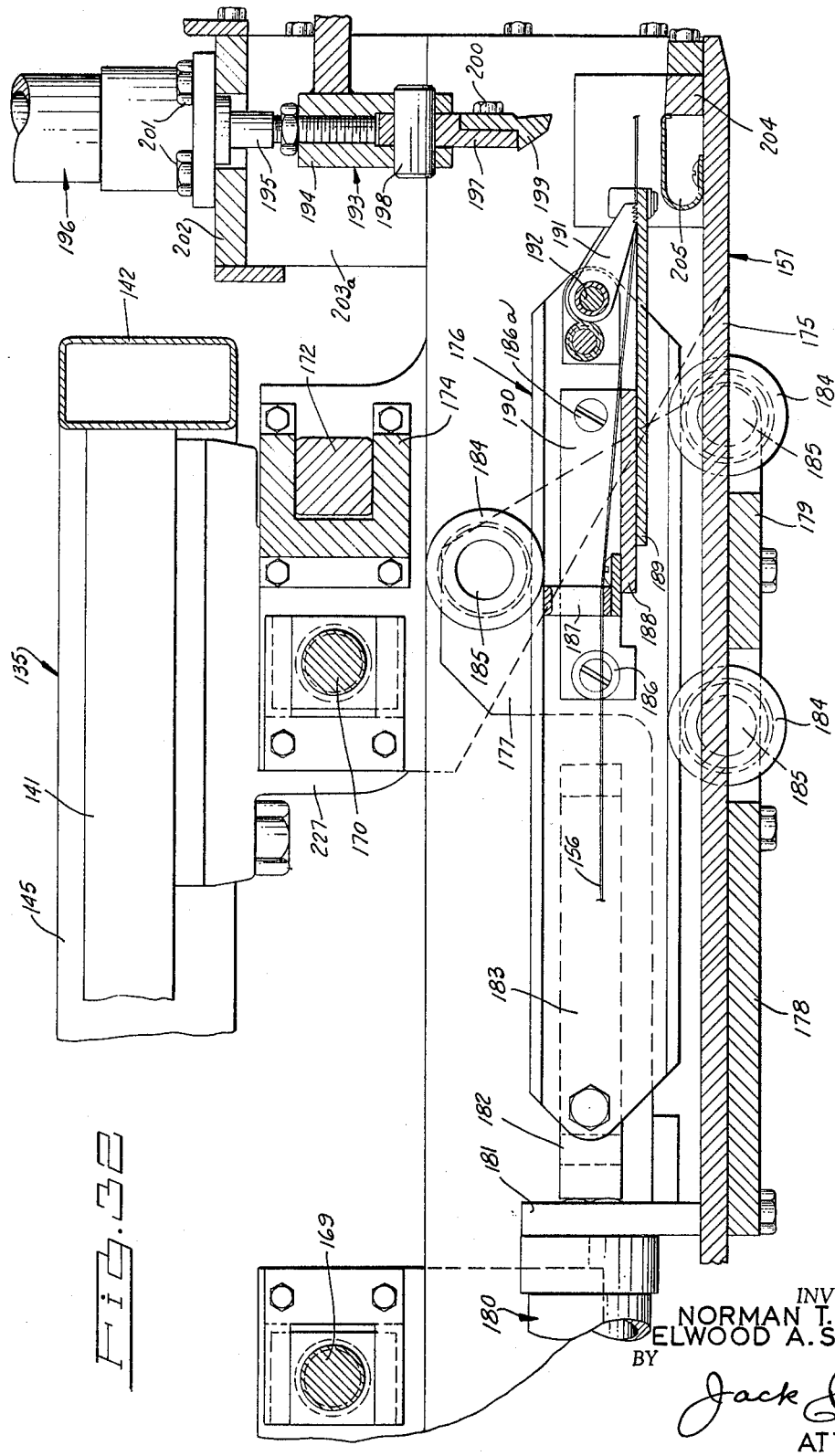

Nov. 18, 1969  N. T. KEHOE ET AL  3,479,238
APPARATUS AND METHOD FOR SUPPLYING SHEET MATERIALS
AND BEADS TO AND ASSEMBLING THE SAME
ON A TIRE BUILDING DRUM
Filed Jan. 8, 1964  17 Sheets-Sheet 11

INVENTORS.
NORMAN T. KEHOE
ELWOOD A. STIEGLER
BY
Jack Rosin
ATTORNEY

Nov. 18, 1969 N. T. KEHOE ETAL 3,479,238
APPARATUS AND METHOD FOR SUPPLYING SHEET MATERIALS
AND BEADS TO AND ASSEMBLING THE SAME
ON A TIRE BUILDING DRUM
Filed Jan. 8, 1964 17 Sheets-Sheet 12

INVENTORS.
NORMAN T. KEHOE
ELWOOD A. STIEGLER
BY Jack Rosin
ATTORNEY

Nov. 18, 1969  N. T. KEHOE ETAL  3,479,238
APPARATUS AND METHOD FOR SUPPLYING SHEET MATERIALS
AND BEADS TO AND ASSEMBLING THE SAME
ON A TIRE BUILDING DRUM
Filed Jan. 8, 1964  17 Sheets-Sheet 13

INVENTORS.
NORMAN T. KEHOE
ELWOOD A. STIEGLER
BY
Jack Rosin
ATTORNEY

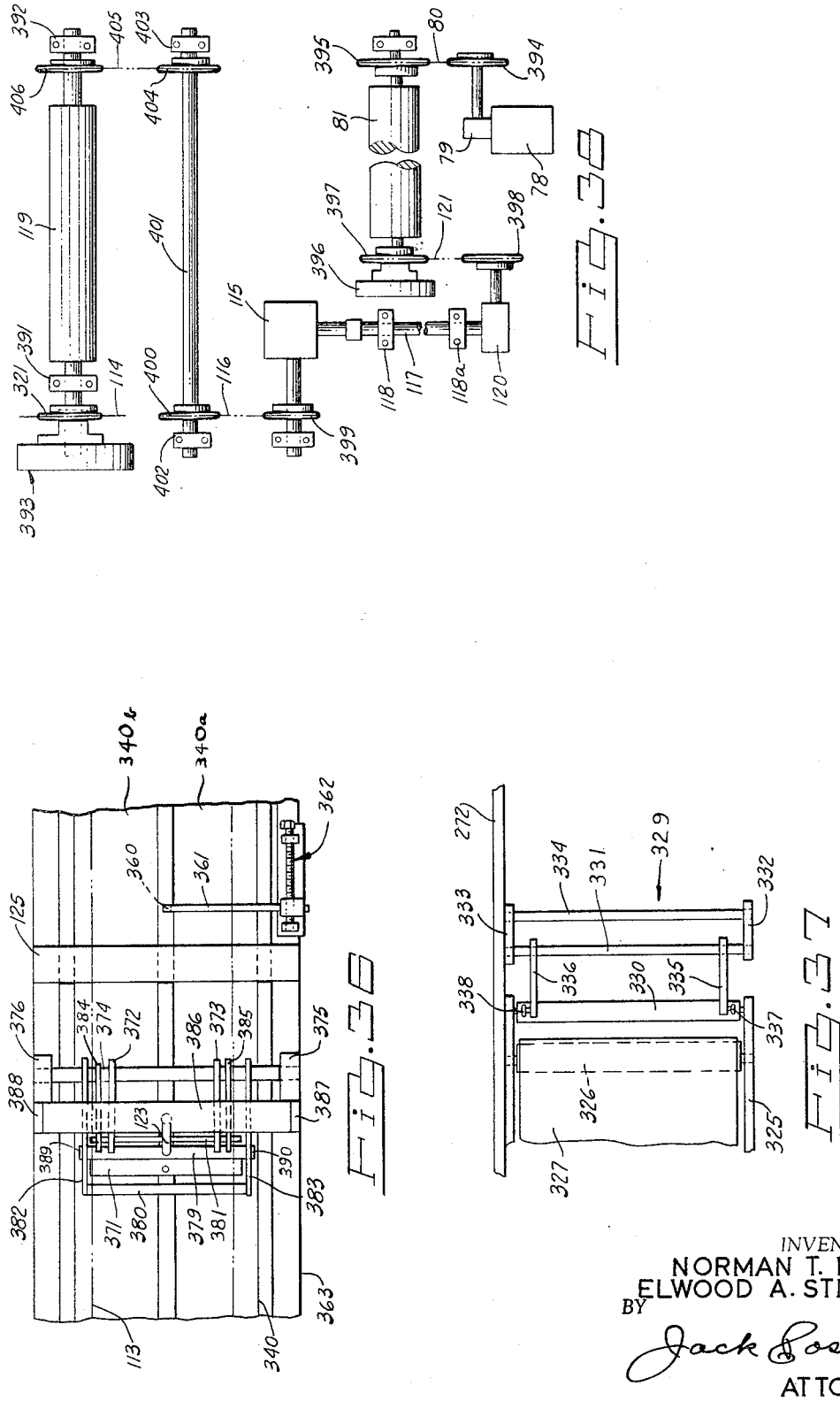

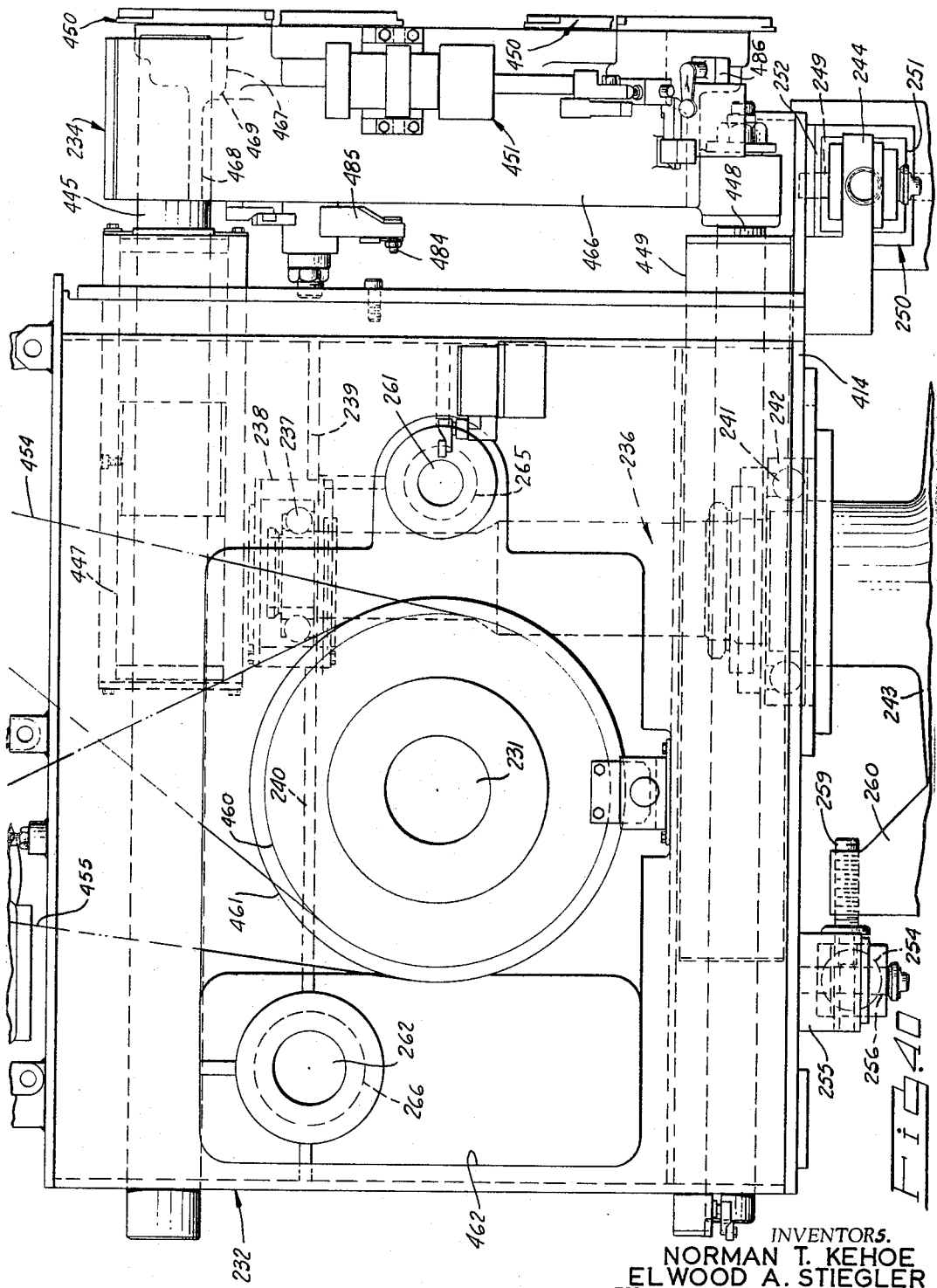

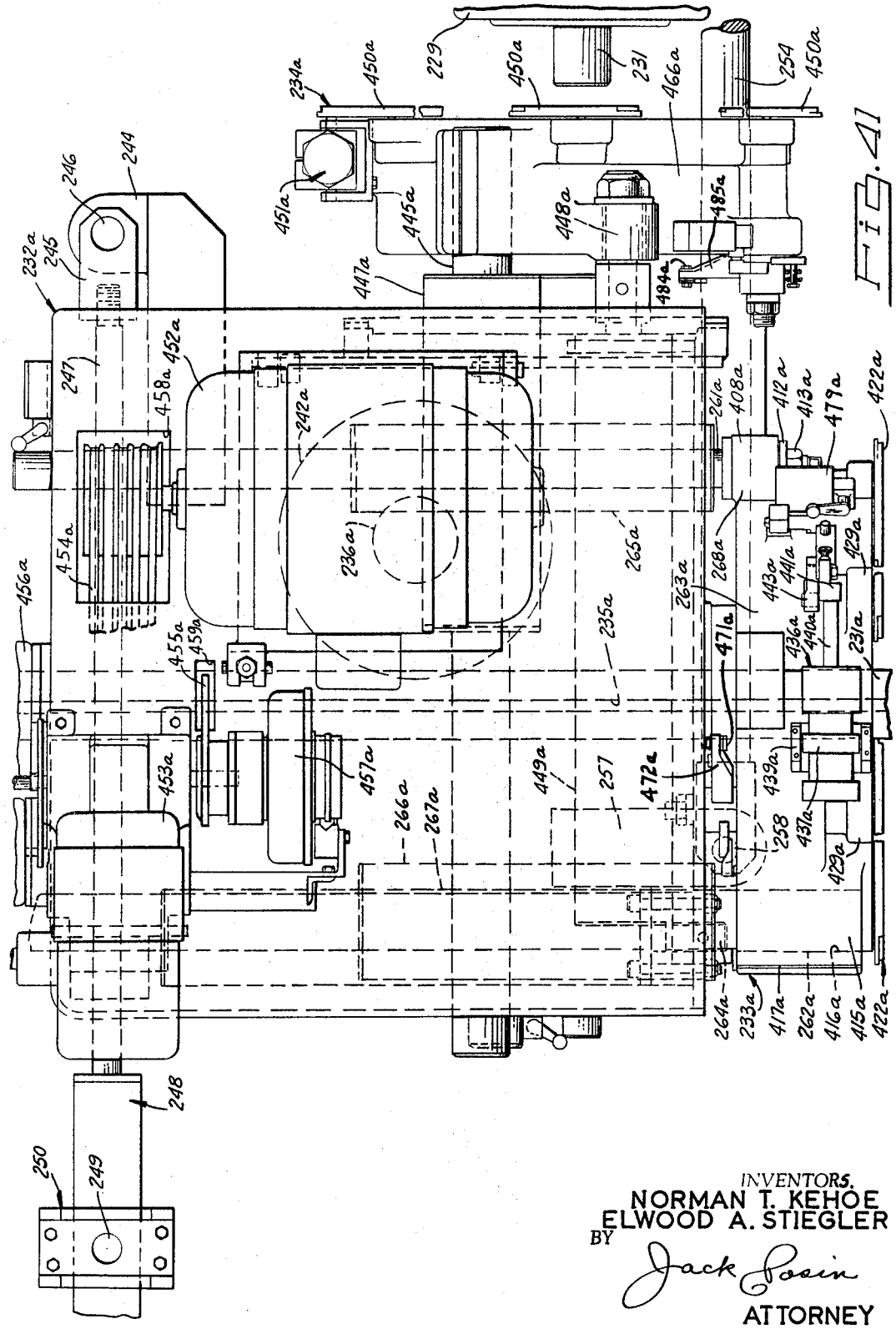

United States Patent Office 3,479,238
Patented Nov. 18, 1969

3,479,238
APPARATUS AND METHOD FOR SUPPLYING SHEET MATERIALS AND BEADS TO AND ASSEMBLYING THE SAME ON A TIRE BUILDING DRUM
Norman T. Kehoe, Detroit, and Elwood A. Stiegler, Grosse Pointe Park, Mich., assignors to Uniroyal, Inc., a corporation of New Jersey
Filed Jan. 8, 1964, Ser. No. 336,495
Int. Cl. B29h 17/04, 17/24
U.S. Cl. 156—111                                      38 Claims

ABSTRACT OF THE DISCLOSURE

An apparatus and method for building tires employing a pair of tire building drums constructed and arranged for alternate movement between a common first position, at which tire components including liners, plies, toe strips and bead rings are applied to the drums, and separate second positions, at which tire tread is applied to the tire components previously mounted on the drums at the first position. Suitable mechanisms are incorporated for cutting the liner material, plies and toe strips to predetermined dimensions, for supplying the same to the drum at the common first position and for assembling these components and suitable beads on the drums at such first position.

---

This invention relates generally to methods and apparatuses for building tire carcasses and, more particularly, to a semi-automatic tire building apparatus and method for making tire carcasses.

Heretofore, tire making machines have been proposed for making tire carcasses in accordance with methods of assembling tire components which include the steps of setting a pair of bead rings against shoulders formed by the inturned edges of a cylindrical band of ply material to locate the bead rings in relation to the band, and then turning the band edges over the bead rings. Such prior machines are not capable of producing tires with the consistent uniformity which is necessary to produce dimensionally accurate and concentric tires. Accordingly, it is an important object of the present invention to provide a novel and improved tire building apparatus which automatically assemblies the tire components on a tire building drum assembly, including the step of locating automatically the bead rings without setting them against any predetermined shoulder, resulting in the production of tires in accordance with uniform standards of construction.

It is an object of the present invention to provide a novel and improved tire building apparatus for making tire carcasses which is semi-automatic in operation.

It is another object of the present invention to provide a novel and improved tire building apparatus for making tire carcasses at a high rate of production, as for example, approximately 1500 tires per day.

It is a further object of the present invention to provide a novel and improved tire building apparatus for making tire carcasses which are dimensionally accurate and concentric, thereby minimizing the possibility of radial run-out or out-of-round condition in the tires.

It is still another object of the present invention to provide a novel and improved semi-automatic tire building apparatus which produces tire carcasses with a minimum amount of labor and time, and which is capable of performing the dual operation of making automatically a carcass on a first tire building drum assembly while a tire tread is applied manually, simultaneously, on a previously formed carcass on a second tire building drum assembly.

It is still a further object of the present invention to provide a novel and improved semi-automatic tire building apparatus which is adapted to build tires of various cross sectional sizes.

It is still another object of the present invention to provide a novel and improved semi-automatic tire building apparatus which is capable of locating the bead rings in a tire carcass so as to maintain a constant and accurate length of fabric between the bead rings, and also maintain a constant length of fabric around the circumference of the uncured tire carcass.

It is still a further object of the present invention to provide a novel and improved semi-automatic tire building apparatus which locates the bead rings in a tire carcass without employing the prior art methods of bead setting.

It is still another object of the present invention to provide a novel and improved semi-automatic tire building apparatus which is constructed and arranged so that the tire fabric used in the apparatus may be visually checked constantly for defective fabric.

It is still a further object of the present invention to provide a novel and improved semi-automatic tire building apparatus which incorporates a novel toe strip applicator means for automatically guiding, cutting to length and applying strips of reinforcing fabric to a tire building drum assembly.

It is still another object of the present invention to provide a novel and improved tire building apparatus which is semi-automatic in operation, and which comprises a pair of tire building drum assemblies which are constructed and arranged for alternate reciprocation between a common first position at which tire components including toe strips, liners, plies, and bead rings are applied to the drum assemblies, and separate second positions at which tire tread is applied to the tire components previously fabricated on the drum assemblies at said common first position; a bias cutter means for providing pieces of fabric which are bias-cut to predetermined widths; means for receiving and storing said bias-cut pieces of fabric and for splicing additional fabric remnants thereto to adjust the length thereof to form a fabric ply; means for supplying, metering and cutting tire liners to predetermined sizes; conveyor means for conveying said fabric plies and liners to said drum assembly common first position; and applicator means for applying tire components to the building drum assemblies at said common first position for forming cylindrical tire bands.

It is still another object of the present invention to provide a novel and improved semi-automatic tire building apparatus embodying a service end portion and a building end portion. The service end portion of the apparatus includes a bias cutter and an adjacently disposed inclined platform adapted to receive pieces of tire fabric from the bias cutter which have been cut to predetermined widths. The service end portion further includes a rectractable splicing platform operatively disposed adjacent said inclined platform, and a storage tray for holding remnants of prior bias-cut pieces of fabric for selective splicing of the remnants with successive bias-cut pieces of fabric to adjust the lengths thereof to form fabric plies. The service end portion further includes a liner storage and processing means, a continuous belt conveyor means for conveying the plies and liners to the building end portion of the apparatus in a predetermined order, and a ply aligning means for aligning the plies on the continuous belt conveyor means. The tire building end portion of the apparatus includes a pair of tire building drum assemblies which are adapted to be reciprocated alternately between a common first position, at which tire components including toe strips, liners, plies and bead rings are applied to a first one of the drum assemblies, and to separate second positions, at which tire tread is applied simultaneously to the other one of the drum assemblies. The tire building drum assemblies are disposed adjacent the downstream end of said continuous belt conveyor means when they are in said common first position. The tire building end portion of the apparatus further includes a toe strip storage and applicator means, an electrostatic liner and ply applicator means, and a pair of laterally spaced apart tire tread applicator stations at said second drum assembly positions. The tire building drum assemblies include novel cylindrical, ply turn-over cages which are convertible for fabricating small diameter tire carcasses by the insertion of a contoured adapter ring having the same internal structural features as the cylindrical, ply turn-over cage.

It is still another object of the present invention to provide a novel and improved method of forming a tire carcass comprising the steps of: forming at least one ply of tire fabric into a cylindrical band; locating a first bead ring around one end region of the cylindrical band and a second bead ring around the other end region of the cylindrical band, in concentric radially spaced relationship with said band, with the bead rings being a predetermined distance apart and in parallel relationship; expanding the end regions of said cylindrical band radially outward and into adhering engagement with said bead rings; and, turning the end regions of the cylindrical band axially inward about the bead rings to adhere the band end regions to the band to form a tire carcass.

It is still another object of the present invention to provide an improved method of forming a tire carcass, including the step of expanding the ply end regions radially outward and retaining them in an expanded condition so as to eliminate excessive stretching and distortion of the ply end regions during a later ply turn-over step of the method.

It is still a further object of the present invention to provide a novel method of forming a tire carcass which comprises the steps of, applying at least one ply of tire fabric about an expandable tire building drum with a conveyor applicator means, to form a cylindrical band with the end regions thereof extended axially outward beyond each end of said expandable drum; moving a bead ring holding means over each end region of said cylindrical band to locate a bead ring over each end region thereof and in concentric radially spaced relation therewith, and at positions axially outward from the adjacent ends of said expandable drum; expanding the end regions of said cylindrical band radially outward with an expandable bladder disposed at each end of the drum and into adhering engagement with the bead rings; radially expanding said drum to radially expand a central portion of said cylindrical band, and to cause simultaneous movement of the end regions of the cylindrical band and the bead rings axially inward towards the ends of said expandable drum in response to the radial expansion of said band central portion; and, moving a cylindrical turn-over cage into operative engagement with each of the expandable bladders to move the end regions of the cylindrical band axially inward about the bead rings to adhere the band end regions to the band to form a tire carcass.

It is still another object of the present invention to provide a novel method of forming, automatically, a tire carcass on a rotatable tire building drum assembly which includes an expandable central drum with an auxiliary drum at each end of said expandable central drum and wherein each auxiliary drum is provided with an expandable bladder, comprising the steps of moving a first applicator means carrying a pair of toe strip applicators into operative contact with the rotatable drum assembly; transferring from said first applicator means a pair of spaced apart toe strips onto the drum assembly while it is rotating; retracting said first applicator means from the drum assembly; placing tire fabric plies in predetermined positions on a first continuous belt conveyor provided with a second applicator means; placing tire liners on a second continuous belt conveyor for transfer onto said first conveyor in predetermined positions relative to said tire fabric plies on the first conveyor when the conveyors are actuated simultaneously; moving the second applicator means into operative contact with said rotatable drum assembly; and, actuating the first and second conveyors and transferring from said second applicator means a liner and at least one ply of tire fabric onto the drum assembly and about the toe strips to form a tire carcass on the drum assembly while it is rotating.

It is still another object of the present invention to provide a novel and improved method of forming a tire carcass comprising the steps of, forming at least one ply of tire fabric into a cylindrical band; locating a first bead ring around one end region of the cylindrical band and a second bead ring around the other end region of the cylindrical band, in concentric radially spaced relationship with said band, with the bead rings being a predetermined distance apart and in parallel relationship; expanding the end regions of said cylindrical band radially outward and into adhering engagement with said bead rings; radially expanding a central portion of said cylindrical band to form a pair of spaced apart, annular, parallel shoulders therein and to cause simultaneous movement of the end regions of the cylindrical band and the bead rings axially inward toward said shoulders in response to the radial expansion of the band central portion; and, turning the end regions of the cylindrical band axially inward about the bead rings to adhere the band end regions to the band to form a tire carcass.

It is still a further object of the present invention to provide a novel method of forming, automatically, a tire carcass on a rotatable tire building drum assembly with the use of continuous belt conveyor means.

It is still another object of the present invention to provide a novel and improved semi-automatic tire building apparatus which includes a service end portion and a tire building end portion.

It is still a further object of the present invention to provide a tire building apparatus which includes a pair of tire building drum assemblies constructed and arranged for alternate movement between a common first position, at which tire components, including plies and bead rings, are applied to the drum assemblies, and separate second positions.

It is still another object of the present invention to provide a tire building apparatus which includes automatic means for supplying, metering and cutting tire liners to predetermined sizes, and for conveying the liners to an applicator means for automatic application on a tire building drum assembly.

Other objects, features and advantages of this invention will be apparent from the following detailed description, appended claims, and the accompanying drawings.

In the drawings:

FIGURE 2 is an enlarged side elevational view of the structure illustrated in FIGURE 1, taken along the line 2—2 thereof, and looking in the direction of the arrows;

FIGURE 3 is a fragmentary, enlarged elevational sectional view of the structure illustrated in FIGURE 1, taken along the line 3—3 thereof, looking in the direction of the arrows, and showing the control for the automatic bias cutting of the ply fabric which is located on the cutting platform of the bias cutter;

FIGURE 4 is an enlarged elevational sectional view of the structure illustrated in FIGURE 1, taken along the line 4—4 thereof, looking in the direction of the arrows, and showing the remnant storage tray, the retractable splicing platform, and the device for properly aligning the prepared fabric plies on the conveyor belt;

FIGURE 5 is a diagrammatic plan view, showing the relation of the plies and liner for fabrication of a two-ply carcass construction;

FIGURE 6 is an enlarged, fragmentary, elevational sectional view of the structure illustrated in FIGURE 4, taken along the line 6—6 thereof, and looking in the direction of the arrows;

FIGURE 7 is a schematic view of the adjusting screws for controlling the aligning of the plies in building a two-ply or a four-ply carcass, and showing the adjusting screws turned 180° from the position shown in FIGURE 4;

FIGURE 8 is an enlarged elevational view of a ply turn-over cage, taken along the line 8—8 of FIGURE 1, and looking in the direction of the arrows;

FIGURE 9 is an enlarged, fragmentary, horizontal sectional view of the structure illustrated in FIGURE 8, taken along the line 9—9 thereof, looking in the direction of the arrows, and showing a bead ring holder and the connecting rod for moving the turn-over cage;

FIGURE 10 is an enlarged, fragmentary, sectional view of the structure illustrated in FIGURE 8, taken along the line 10—10 thereof, looking in the direction of the arrows, and showing the control for stopping the inflation of the bladder and initiating subsequent actions;

FIGURE 11 is an elevational view, similar to FIGURE 8, and showing the bead ring holders of the ply turn-over cage rotated 60° from the position shown in FIGURE 8;

FIGURE 12 is an enlarged, fragmentary, elevational sectional view of the structure illustrated in FIGURE 8, taken along the line 12—12 thereof, looking in the direction of the arrows, and showing a low voltage contact employed in controlling the ply turn-over cage movement for proper bead ring location;

FIGURE 13 is a fragmentary, elevational sectional view of the structure illustrated in FIGURE 12, taken along the line 13—13 thereof, looking in the direction of the arrows, and showing the drive means for rotating the bead ring holders;

FIGURE 14 is a fragmentary, schematic sectional view showing the relative positions of the tire carcass components, the tire building drum, and the ply turn-over cage prior to processing the bead ring regions of the carcass;

FIGURE 15 is an enlarged, fragmentary sectional view of the structure illustrated in FIGURE 8, taken along the line 15—15 thereof, looking in the direction of the arrows, and showing the ply turn-over cage moved to the bead ring locating position;

FIGURE 16 is an enlarged, fragmentary, sectional view of the structure illustrated in FIGURE 8, taken along the line 16—16 thereof, looking in the direction of the arrows, and showing the second step in the bead ring locating operation wherein the bladder is inflated to set the bead ring and actuate the limit switch control illustrated in FIGURE 10;

FIGURE 17 is an enlarged, fragmentary, elevational sectional view of the structure illustrated in FIGURE 11, taken along the line 17—17 thereof, looking in the direction of the arrows, and showing the bead ring holders turned out of engagement with the bead ring;

FIGURE 18 is a sectional view similar to FIGURE 17, with parts removed, and showing the building drum expansion step;

FIGURE 28 is an enlarged plan view of the toe strip applicator structure illustrated in FIGURE 2, taken in the direction of the arrow marked "28;"

FIGURE 29 is an enlarged, fragmentary, end view, partly in section, of the toe strip applicator structure illustrated in FIGURE 28, taken along the line 29—29 thereof, and looking in the direction of the arrows;

FIGURE 30 is an enlarged, fragmentary, sectional view of the structure illustrated in FIGURE 28, taken along the line 30—30 thereof, looking in the direction of the arrows, and showing one of the toe strip applicator rollers;

FIGURE 31 is a fragmentary, elevational sectional view of the toe strip applicator roller structure illustrated in FIGURE 30, taken along the line 31—31 thereof, and looking in the direction of the arrows;

FIGURE 32 is an enlarged, fragmentary, elevational sectional view of the toe strip applicator structure illustrated in FIGURE 29, taken along the line 32—32 thereof, and looking in the direction of the arrows;

FIGURE 36 is a fragmentary sectional view of the structure illustrated in FIGURE 33, taken along the line 36—36 thereof and looking in the direction of the arrows;

FIGURE 37 is a fragmentary, top view of the structure illustrated in FIGURE 33, taken along the line 37—37 thereof, and looking in the direction of the arrows;

FIGURE 38 is a schematic view of the power drive train for actuating simultaneously the liner storage conveyor and the main conveyor;

FIGURE 39 is a top view of the right turret which carries the right drum assembly;

FIGURE 40 is a right end elevational view of the turret structure illustrated in FIGURE 39, taken along the line 40—40 thereof, and looking in the direction of the arrows; and, FIGURE 41 is a top plan view of the left turret structure which carries the left tire building drum assembly.

Figure 1:
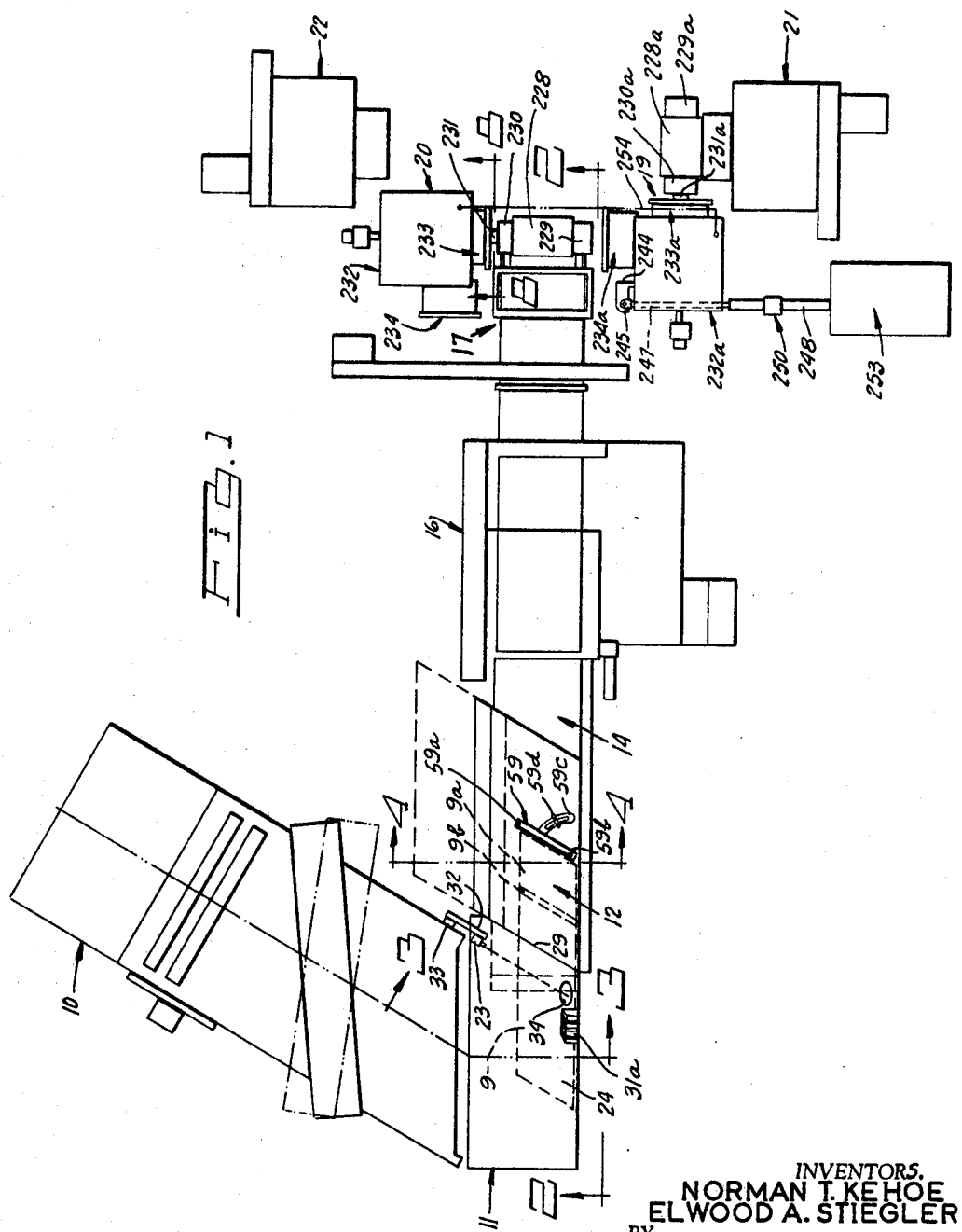
FIGURE 1 is a diagrammatic plan view of a semi-automatic tire building apparatus made in accordance with the principles of the present invention.

The apparatus and method of the present invention are described hereinafter in connection with the building of a two-ply tire carcass. However, it will be understood that the apparatus and method may be used in the building of tire carcasses having any standard number of plies and other tire components. It will also be understood that the plies may be of various widths, and that they may be disposed in alignment with each other, or in offset relationship.

GENERAL DESCRIPTION

Referring now to the drawings and, in particular, to FIGURES 1 through 4, and 6, the tire building apparatus of the present invention comprises generally a service end portion and a building end portion. The service end portion of the tire building apparatus comprises a conventional basic bias cutter, generally indicated by the numeral 10, for supplying strips or pieces of fabric 9 which are bias-cut to desired widths. The service end portion of the apparatus further includes an inclined platform, generally indicated by the numeral 11, which is disposed adjacent the discharge end of the bias cutter 10 for receiving the bias-cut fabric pieces 9. The service end portion of the apparatus of the present invention further includes a retractable splicing platform, generally indicated by the numeral 12, and which has one end adjacently aligned with one end of the inclined platform 11. The bias-cut fabric pieces 9 are slid manually by a first operator from the inclined platform 11 onto the retractable splicing platform 12. The retractable splicing platform 12 is disposed over the upstream end of a continuous belt conveyor, generally indicated by the numeral 14, and the splicing platform 12 comprises one of the units in the service end portion of the tire building appparatus. A ply remnant storage tray, generally indicated by the numeral 13, is disposed over the retractable splicing platform 12 for storing pieces of fabric or ply remnants from prior fabricated plies for hand splicing by the first operator to later processed pieces of fabric 9, to provide plies of desired sizes.

The spliced pieces of fabric 9 are manually cut to length and then they are transferred manually onto the continuous belt conveyor 14 by the first operator. The retractable splicing platform 12 is moved rearwardly to a retracted position by a suitable power means which is actuated by a foot pedal, as more fully described hereinafter. The service end portion of the tire building apparatus further includes a ply aligning means, generally indicated by the numeral 15, which is adapted to locate the plies properly on the continuous belt conveyor 14 after they have been transferred manually onto the same from the retractable splicing platform 12. The final unit in the service end portion of the tire building apparatus is the liner processing means, generally indicated by the numeral 16, which processes air impervious tubeless tire liners automatically to the required lengths and widths and deposits them onto a storage conveyor for transfer to the continuous belt conveyor and thence to the building end portion for further processing.

The building end portion of the tire building apparatus includes a pair of tire building drum assemblies, generally indicated by the numerals 19 and 20, which are constructed and arranged in left and right positions for alternate movement between a common first position, at which tire components such as toe strips, liners and plies are applied automatically thereon, and to separate second positions, at which tire tread is applied manually to the tire fabric mounted on the drum assemblies at said common first position. It will be understood that when the right drum assembly 20 is in the common first position having a tire carcass formed automatically thereon, as shown in FIGURE 1, the left drum assembly 19 will be in its separate second position having at the same time a tire tread applied onto the carcass which was formed previously on the left drum assembly 19 when it was disposed in said first position. The numerals 21 and 22 generally indicate left and right conventional tread slab conveyors for alternate manual application of tire tread to tire carcasses on the fire building drum assemblies 19 and 20. The treaded carcasses are removed from the drum assemblies at the separate second positions.

The building end portion of the tire building apparatus further includes an electrostatic liner and ply applicator means, generally indicated by the numeral 18, and a toe strip storage and applicator means, generally indicated by the numeral 17. The toe strip storage and applicator means 17 is adapted to contact operatively the top side of the drum assemblies 19 and 20 and to apply automatically a pair of spaced apart toe strips on these drum assemblies in the bead ring regions. The continuous belt conveyor 14 receives the metered liners from the liner storage conveyor and transfers the liners and plies in predetermined aligned positions to the liner and ply applicator means 18. The aligned positions on the storage belt conveyor 14 are such that the liner overlaps the first ply of each tubeless tire to be built by the machine in an amount sufficient to insure that the respective splices of the liner and the first ply are angularly separated in such tire. The liner and ply applicator means 18 operatively engages the bottom side of the drum assemblies 19 and 20 and applies automatically the liners and plies on these drum assemblies.

The tire building apparatus of the present invention further includes cylindrical turn-over cages for automatic co-action with the drum assemblies 19 and 20, as more fully described hereinafter. The aforedescribed service end portion and building end portion units are adapted to be controlled, individually and collectively, by means of electrical and hydraulic controls such as would be used by those skilled in the art. These controls are within the realm of selection by the skilled mechanic and no invention is seen in using any of the variety of forms thereof which may be employed to accomplish the desired function in the proper sequence and in the desired time relation.

As shown in FIGURE 1, the inclined platform 11, the retractable splicing platform 12, the continuous belt conveyor 14, the liner processing means 16, and the toe strip storage and applicator means 17 are aligned and interconnected into one elongated assembly. The bias cutter 10 is disposed at the left end of this assembly, as viewed in FIGURE 1, and it is disposed at an angle substantially in accordance with the bias-cut made in the tire fabric. The drum assemblies 19 and 20 are disposed on opposite sides of said elongated assembly, at the right end thereof, for alternate coaction with the other aforementioned units.

BIAS CUTTER AND PLATFORM

FIGURE 1 of the drawings illustrate schematically a conventional basic bias cutter 10 which is the first service unit in the tire building apparatus and which is adapted to bias-cut strips of tire fabric 9 to the desired ply widths. One example of a suitable bias cutter, for cutting ply trips of tire fabric to desired widths before winding the same on a tire building drum, is illustrated in the copending application of Clarence M. Parshall, Elwood A. Stiegler, Philip A. Phillips and Paul Geyer, Ser. No. 176,229, filed Feb. 28, 1962, now U.S. Patent No. 3,142,603, assigned to the assignee of the present invention. Other suitable bias cutters are shown and described in detail in the U.S. Patents Nos. 2,733,766, which issued to G. F. Wikle and is assigned to the assignee of the present invention, and 2,681,103, which issued to A. C. Hirsch and is assigned to the assignee of the present invention. The disclosures of the above-mentioned copending application and said patents are incorporated by reference herein.

The bias cutter 10 is controlled by programming the actions of the same in such a manner that it always will meter predetermined widths of tire fabric and will cut only on demand. The bias cutter 10 may be programmed, either manually or automatically, by the light source 23 and the photoelectric receiver cell generally indicated by the numeral 35 in FIGURE 3. The operator of the service end portion of the tire building apparatus thus may select a desired width and manually operate the bias cutter 10 to provide the same. The automatic signal programs the bias cutter 10 for cutting alternate widths. The wide fabric pieces 9 are cut after the bias cutter 10 moves the fabric forward to the required position. The operator also may control the bias cutter 10 to produce alternate widths.

As shown in FIGURES 2 and 3, the inclined platform 11 comprises a substantially rectangular flat plate 24 which is disposed adjacent the discharge end of the bias cutter 10 to receive the bias cut pieces of fabric for further processing. The metal plate 24 slopes forwardly and downwardly and is disposed with its longitudinal axis in alignment with the retractable splicing platform 12. As best seen in FIGURE 3, the plate 24 is provided with a plurality of spaced apart transverse angle bars as 25 which function as stiffener members and which are fixedly secured to the underside of plate 24 by any suitable means, as by welding. The plate 24 is supported by suitable ground engaging vertical front and rear frame members, as 26 and 27, respectively, which are fixedly interconnected by horizontal angle irons as 28. The left end of the plate 24, as viewed in FIG. 2, is formed substantially square with the front of the plate. The right end 29 of the plate 24 is formed at an angle substantially equal to the bias cutting angle. As shown in FIGURE 2, the right end of the platform plate 24 is connected to and supported by the rearwardly extended channel rail member 30 which forms a part of the supporting frame for the letf end of the retractable platform, 12. The inclined platform 11 is provided with a plurality of vertical, spaced apart stops 31 along the front side of the plate 24 to stop the downward sliding movement of the bias-cut pieces of fabric 9 as they are received from the bias cutter 10. A ply length cutting gage 31a is mounted along the front side of the inclined platform 11 and is provided with four slots to assist the service end operator in cutting the plys to the desired length for one-ply, two-ply, three-ply and four-ply tires.

As shown in FIGURES 1 and 3, the light source 23 for the photoelectric receiver cell 35 is operatively mounted on a supporting arm 32 which is carried on the vertical post 33 mounted on the front end of the bias cutter 10. The inclined platform plate 24 is provided with a suitable hole 34 to permit the light source 23 to direct a light beam to the receiver cell 35 which is disposed under the plate 24. The receiver cell 35 may be supported by any suitable means as, for example, by the inclined table stiffener bars 25. It will be understood that the hole 34 is aligned with the light source 23 and the receiver cell 35 to permit a light beam to pass therethrough. The bias cutter 10 will not operate automatically when a piece of fabric 9 is disposed on the inclined platform 11 so as to cover the hole 34. In making a manual selection, the service end operator must first remove the remnant or piece of fabric 9 from under the ray of light detected by the photo-electric receiver cell 35, and then select the desired manual button for the width of fabric cut required for further processing.

SPLICING PLATFORM AND REMNANT TRAY

The second service unit, as shown in FIGURES 2 and 4, comprises the retractable inclined splicing platform 12 and the remnant storage tray 13 for storing remnants of pieces of fabric 9a. The splicing platform 12 comprises the tray 36 which is suitably supported in a frame 37. The tray 36 may be made from any suitable material as, for example, a flat metal plate. As shown in FIGURE 1, the tray 36 is shaped as a parallelogram with the sides disposed at an angle substantially similar to the bias-cut angle of the pieces of fabric 9. The splicing tray frame 37 is rollably supported by suitable rollers (not shown) operatively mounted in the channel rail members 30 and 38 which are disposed on opposite ends of the tray 36 in parallel disposition therewith.

As shown in FIGURES 2 and 4, the front ends of the channel rail members 30 and 38 are secured fixedly to the upper ends of the conveyor vertical frame members 39 and 40. As may be seen in FIGURE 4, the splicing platform 12 slopes upwardly and rearwardly and the channel rail members 30 and 38 are adapted to be supported at the rear by a frame structure generally indicated by the numeral 42. The front end of the supporting frame 42 is adapted to be supported by means of the vertical support member 43 which is connected in a fixed manner to the conveyor vertical frame member 44. The rear end of the splicing platform supporting frame 42 is supported suitably by the brace 41 which is connected at its lower end to the rear side of the conveyor frame structure by any suitable means.

In FIGURE 2, the splicing tray 36 is shown in the retracted position to permit transferring of the fabric plies to the conveyor 14. As shown in FIGURE 4, the splicing tray 36 is in the extended or forward position for use in a splicing operation. The splicing tray 36 is adapted to be moved between the aforedescribed retracted and extended positions by the following described structure. As shown in FIGURE 4, a rearwardly extended bracket 45, in the form of an elongated bar, is secured to the underside of the tray 36 by any suitable means, as by welding. The bracket 45 is located substantially on the center line of the tray 36 and it extends rearwardly beyond the rear edge of the tray 36. Fixedly mounted on the rear end of the bracket 45 is a vertically disposed bracket 46, on the rear end of which is connected hingedly the clevis 47 by means of the hinge pin 48. The clevis 47 is connected to the outer end of the pneumatic cylinder rod 49. The rear end of the cylinder rod 49 is mounted operatively in the pneumatic cylinder generally indicated by the numeral 50. As shown in FIGURE 4, the pneumatic cylinder 50 is hinged at the forward end thereof between the two vertical plates 51 and 52 by means of a pair of pivot pins 53. The vertical plates 51 and 52 are connected to suitable supporting bars as 54 which are fixed to the upper side of the supporting frame 42.

The splicing platform 12 is provided with a guide bar 55 which is connected operatively to the underside of the tray 36 by means of the connector bracket 56 which is secured fixedly to the front end of the bracket 45. The guide bar 55 extends rearwardly through a suitable bearing member 57 which is mounted operatively between the cylinder supporting plates 51 and 52. The pneumatic cylinder 50 is adapted to be operated by the service end operator, by means of a suitable foot switch (not shown), in order to move the splicing tray 36 in and out of the extended position, as required by the operator.

As shown in FIGURES 2 and 4, the splicing tray 36 is provided with a suitable stop 58 on the front edge thereof. The splicing tray 36 may also be provided with a suitable gauge, generally indicated by the numeral 59 in FIGURES 1 and 2, for determining the position of the leading end of a strip of fabric 9 when cutting the strip to form a ply of a desired length.

The gauge 59 includes the elongated rule 59a which is connected pivotally at the lower end thereof to the splicing tray 36 by means of the hinge pin 59b. The rule 59a is adapted to be disposed at an angle identical to the bias-cut of the pieces of fabric 9 being processed into plies. The rule 59a is held in a desired adjusted angular position by means of a bracket 59c which is fixed to the rule 59a at one end thereof and which is secured to the splicing tray 36 by means of the wing nut and bolt combination 59d. The bracket 59c is arcuate in plan configuration and it is provided with an arcuately shaped slot through which the last mentioned bolt passes to permit angular adjustment of the rule 59a.

The remnant storage tray 13 comprises a rectangular shelf 60 which is adjustably mounted on the front ends of a pair of spaced apart support arms 61 and held in adjusted positions by a suitable friction gripping means, as shown in FIGURE 4. The rear ends of the support arms 61 are adjustably connected to vertical brackets 62 which are connected to a cross tube 63. The tube 63 is disposed above the level of the splicing tray 36 to permit passage of the same thereunder and is supported by means of the brackets 64 which are fixedly mounted to the frame rails 30 and 38 which support the splicing tray frame 37. As shown in FIGURE 4, the bracket 45 carries a vertical plate 45a on one side thereof and on which is mounted a limit switch actuator dog 45b. It will be seen that when the splicing tray 36 is retracted, the dog 45b will be moved rearwardly, or to the left as viewed in FIGURE 4, and will operatively engage the limit switch 45c which is mounted on the support bar 54. The operation of limit switch 45c actuates the main continuous belt conveyor 14 when the splicing tray 36 starts moving to the extended position of FIGURE 4.

PREPARATION OF THE PLIES

The process of preparing the plies and the control of the aforedescribed units will be explained in relation to the narrow and wide plies 65 and 66, respectively, shown in FIGURE 5. The service end operator actuates the power means for moving the splicing platform 12 from the retracted position shown in FIGURE 2 to the extended position shown in FIGURE 4. The narrow ply 65 is prepared first. Assuming that ply remnants of both widths are available on the storage tray 13, the operator selects a narrow ply remnant 9a and places it on the platform tray 36, as shown in FIGURE 1, against the stop 58 and the gauge rule 59a. This operation puts the bias cutter 10 on automatic operation. If the selected ply remnant 9a is not long enough to cover the receiver cell hole 34 in the inclined platform plate 24 so that a proper length ply could be cut, the operator selects the narrow cut control and manually operates the bias cutter 10 to cut the desired narrow piece of fabric 9. The operator then slides the bias-cut narrow piece of fabric 9 onto the fabric receiving platform 12 and hand splices it to the left end of the remnant 9a on the platform 12. The splicing operation is carried out by bringing the leading or right end of the piece of fabric 9, as viewed in FIGURE 1, into overlapping adhesive contact with the left end of the ply remnant 9a. The photo-electric cell hole 34 is covered during this process.

Subsequent bias-cut pieces 9 will be made automatically, alternating from narrow to wide pieces, unless otherwise designated by the service end operator. The service end operator cuts the ply between two cords to the required length by placing the blade of a knife in the appropriate slot of the gauge 31a and moving the knife upwardly to sever the piece of fabric 9. The ply 65 is then ready for transferring to the main conveyor 14.

The operator holds the edge of the prepared fabric ply with both hands and actuates a foot switch (not shown) in order to operate the pneumatic cylinder 50 to retract the splicing tray 36 to the retracted position shown in FIGURE 2. The service end operator then places the ply 65 on the conveyor 14 against the ply aligning device 15.

The service end operator then actuates two hand switches (not shown) to return the platform tray 36 to the extended or ply preparation position shown in FIGURE 4. The main conveyor 14 indexes forwardly, to the right as shown in FIGURE 2, as the splicing tray 36 returns to the extended position of FIGURE 4 because of the aforedescribed actuation of the limit switch 45c. The ply remnant which was cut from the first ply 65 in the preparation of the same is still disposed on the inclined platform plate 24 and in a position to cover the photoelectric cell hole 34.

The second, or wide, ply 66 is processed in a similar manner except that the wide remnant 9a necessary for making the same is located on the retractable splicing tray 36 after the narrow remnant from the prior narrow ply 65 is removed from the inclined platform 11. The second, or wide, ply 66 is placed on the main conveyor 14 in the same manner as described hereinbefore for the ply 65. However, the second ply 66 is turned over in order to dispose the cord angle of the two plies in opposite directions. The bias-cut angle of the fabric is made greater than the carcass angle which is reduced during fabrication by the expansion of the central drums of the tire building assemblies. This feature is necessary in order to meet prescribed standards in tire carcass construction.

CONTINUOUS BELT CONVEYOR

As shown in FIGURES 2 and 4, the continuous belt main conveyor 14 is located under the splicing platform 12 and extends to the tire building end of the apparatus. The main conveyor 14 includes a plurality of vertical supporting frame members as 39, 40, 67, 68, 69 and 44. The first-mentioned vertical frame members are disposed along the front of the apparatus, as viewed in FIGURE 2. As shown in FIGURE 4, the vertical frame member 44 is disposed on the rear side of the conveyor frame and a plurality of similar vertical frame members as referred to above are disposed in spaced apart positions along the rear side of the conveyor frame. The conveyor frame structure also includes suitable transverse supports for interconnecting the aforementioned vertical frame members.

As best seen in FIG. 4, the main conveyor 14 includes the vertical side plate members 70 and 71 which are secured in a fixed manner to the inner sides of the conveyor vertical frame members and which are provided on the upper ends thereof with the inwardly turned horizontal flanges 72 and 73, respectively, which support a conveyor belt side plate 85 over which is mounted slidably the main conveyor belt 74. A suitable conveyor belt for use in the main conveyor 14 is shown and described in detail in United States Patent No. 3,071,179, which issued to F. Tourtellotte et al. and is assigned to the assignee of the present invention. The main conveyor belt 74 is adapted to be moved over the conveyor belt slide plate 85 in a sliding manner to the downstream end of the conveyor 14, as viewed in FIGURE 2. The main conveyor belt 74 passes over the electrostatic liner and ply applicator means 18, which forms a part of the main conveyor system, and which will be described hereinafter in detail.

The main conveyor belt 74 is reversed in its direction of travel when it passes around the liner and ply applicator means 18 and it then travels to the left, back to the upstream end of the conveyor 14, as viewed in FIGURE 2. The returning portion of the main conveyor belt 74 is supported in its return travel by the transversely disposed return rollers 77 (FIGURE 2) which are mounted operatively between the spaced apart, longitudinally extended angle bars 75 and 76. As shown in FIGURE 4, angle bars 75 and 76 are secured fixedly to the inner sides of the conveyor wall plates 70 and 71, respectively, by any suitable means, as by welding.

The main conveyor belt 74 may be driven by any suitable power means. As shown in FIGURE 2, an electric motor 78 is provided for driving the conveyor belt 74 at the desired speed. The electric motor 78 is connected operatively to a suitable gear reduction mechanism 79 which in turn is connected operatively to the main conveyor belt drive roll 81 by means of suitable sprockets and drive chain 80. The tension of the main conveyor belt 74 is adjusted at the left end of the apparatus, as viewed in FIGURE 2, by means of the idler rolls 82 and 83. The main conveyor belt 74 passes around the roll 83 and over the roll 82, and thence around the drive roll 81.

PLY ALIGNING MEANS

As shown in FIGURES 4 and 6, the ply aligning means 15 is located beneath the retractable splicing platform 12 and is provided with a plurality of pneumatic cylinders for controlling the operation thereof. The ply aligning means 15 includes the gauge rail 86 which is adapted to be disposed in various selected transverse positions over the main conveyor belt 74 for the alignment of various size plies on the main conveyor belt 74. The gauge rail 86 is fixed at the rear end thereof, as by welding, to the horizontal angle bar 87 which is hinged on the rear side of the vertically disposed adaptor plate 89 by means of the hinge shaft 88. The gauge rail 86 is adapted to be swung upwardly and downwardly about the hinge shaft 88 by means of a pneumatic cylinder, generally indicated by the numeral 91. The outer end of the cylinder rod 91a is connected by the hinge pin 91b to the bracket 90 which is fixed to the angle bar 87. The lower end of the cylinder 91 is also connected to the adaptor plate 89 by a suitable bracket and the hinge pin 91c.

The ply aligning means 15 further includes the supporting cross member 92 which is fixedly connected by any suitable means to the longitudinal angle bars 75 and 76 of the conveyor 14. Fixed to the lower side of the cross member 92 and depending therefrom is a vertically disposed cylinder mounting plate 93. Fixedly mounted on the rear side of the plate 93 are the pneumatic cylinders 94, 95, 96 and 97 which control the position of the gauge rail 86.

As shown in FIGURES 4 and 6, a vertical rear bearing plate 98 and a vertical front bearing plate 99 are attached in a suitable manner to the opposite ends of a transverse spacer bar 100. The bearing plates 98 and 99 are mounted for slidable forward and rearward motion on a transverse shaft 101. The shaft 101 is supported at the rear end thereof by the plate 93 and at the front end thereof by a bracket 102 which depends from the cross member 92. The adaptor plate 89 is connected in a fixed manner to the rear bearing plate 98.

It will be seen that the transverse position of the gauge rail 86 over the main conveyor belt 75 is controlled by the service end operator by operating manually the controls for the pneumatic cylinders 94, 95, 96 and 97. The transverse position or setting of the gauge rail 86 on the conveyor belt 74 determines the position in which the plies are placed on the conveyor belt 74 by the service end operator. The ply aligning gauge rail 86 is adapted to be moved rearwardly, or to the left as viewed in FIGURE 4, by the pneumatic cylinder 94, and it is adapted to be moved forwardly, or to the right as viewed in FIGURE 4, by the pneumatic cylinders 95, 96 and 97.

As illustrated in FIGURES 4 and 7, the pneumatic cylinder 94 is provided with a cylinder rod 94a which is adapted to move outwardly when the cylinder 94 is operated and to engage the rear bearing plate 98 and move the adaptor plate 89 rearwardly. The rearward movement of the adaptor plate 89 adjusts the gauge rail 86 rearwardly to a position for determining the placement of a wide ply on the conveyor belt 74 by the service end operator. The rearward movement or amount of shifting of the gauge rail 86 by the action of the pneumatic cylinder 94 to the desired position is controlled by the manual adjustment of screw 103. It will be seen that when the cylinder rod 94a engages the rear bearing plate 98 to move it rearwardly, the front bearing plate 99 will also be moved rearwardly because of its interconnection with the rear bearing plate 98 by means of the spacer bar 100. The adjusting screw 103 is threadably mounted through the front bearing plate 99 and the inner end thereof will abut the front side of the cylinder mounting plate 93 to limit the rearward movement of the adaptor plate 89 and the gauge rail 86 which is carried thereon.

As shown in FIGURE 7, the cylinders 95, 96 and 97 are provided with the cylinder rods 95a, 96a and 97a, respectively. The cylinder rods 95a, 96a and 97a, are adapted to be moved outwardly when their respective cylinders are operated selectively and to engage the inner ends of the adjusting screws 103a, 103b and 103c, respectively. The adjusting screws 103a, 103b and 103c are threadably mounted through the front bearing plate 99 and the disposition of the inner ends of these adjusting screws will determine the amount of forward movement of the front bearing plate 99 and the gauge rail 86, by the action of the cylinder rods 95a, 96a and 97a engaging these screw ends. The cylinder rods 95a, 96a and 97a are all of equal length and, as shown in FIGURE 7, the uneven disposition of the adjusting screws 103a, 103b and 103c will cause the cylinder rods 95a, 96a and 97a to move the gauge rail 86 forwardly a predetermined distance corresponding to the setting of these adjusting screws. The cylinder 94 is the only cylinder used for moving the gauge rail 86 rearwardly for locating the widest ply and one of the other three cylinders 95, 96 or 97 is used for locating the narrow ply. All of the four cylinders 94, 95, 96 and 97 are used only when making a four-ply carcass. Only two of the cylinders are used when making a two-ply carcass.

The ply aligning structure 15 is prevented from rotating about shaft 101 by means of the stabilizer bar 104 which is shown in FIGURES 4 and 6. The stabilizer bar 104 is fixed to the conveyor angle bar 75 and extends toward the rear side of the conveyor 14. A longitudinally disposed bar 105 is connected at its outer end in a fixed manner to the vertical plate 106 which is provided with a pair of vertically spaced apart rollers 107 that are rollably engaged with the top and bottom edges of the stabilizer bar 104. The inner end of the bar 105 is connected in a fixed manner by means of a vertical bracket 108 to the front bearing plate 99. The aforedescribed stabilizing structure insures a parallel relation between the gauge rail 86 and the belt 74 of the main conveyor 14.

LINER PROCESSING MEANS

Figure 33:
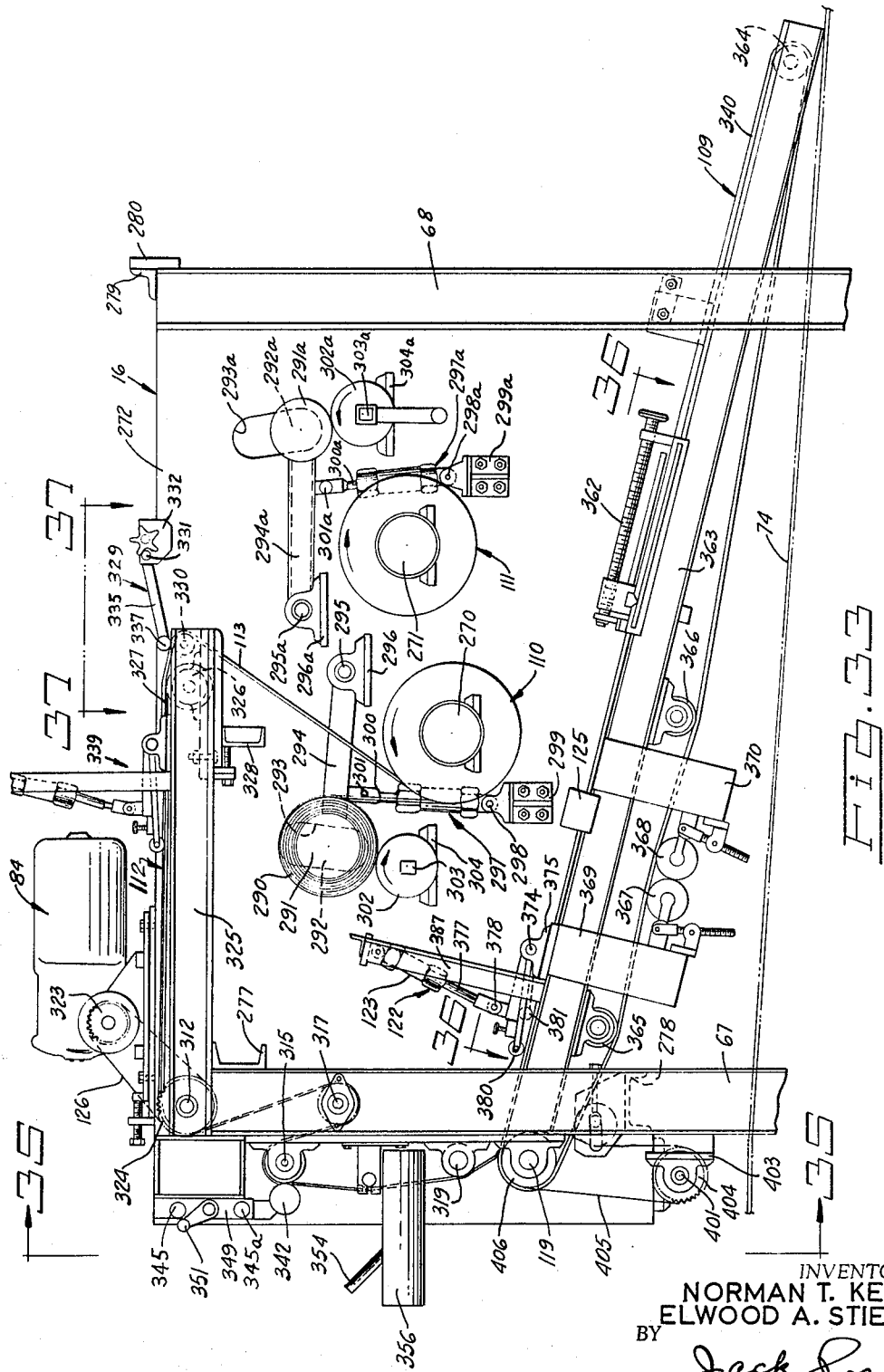
FIGURE 33 is an enlarged, fragmentary, elevational front view of the tire liner processing structure illustrated in FIGURE 2.

The third service unit in the tire building apparatus is the tire liner storage and processing means 16, shown in FIGURES 1, 2, and 33 through 37. This unit provides for storing the rolled liner stock, edge trimming the liner stock to the proper width, hot knife cutting the liner stock to the required length, and locating the tire liners on the main conveyor 14. An electrostatic device is incorporated in the liner processing means 16 for holding the trailing ends of the liners flat on the main conveyor belt 74 when they are transferred thereto. This unit is operated automatically, except for loading the storage rolls of liner stock. During the aforedescribed ply preparation the liner processing means 16 automatically processes a tire liner and deposits the same on the inclined storage conveyor 109 of the liner processing device, as shown in FIGURES 2 and 33. As best seen in FIGURES 1 and 2, the liner processing means 16 is disposed in vertical alignment over the main conveyor 14 and to the right of the retractable splicing platform 12. It is supported in a frame formed between the main conveyor vertical frame members which are extended upwardly, as seen in FIGURES 2 and 3. The liner processing means 16 is provided with two rolls of tire liner stock indicated by the numerals 110 and 111. As shown in FIGURES 2 and 33, the liner web or liner stock 113 is being drawn from the roll 110. The extra roll 111 is adapted to be quickly spliced to the trailing end of the liner stock on the roll 110 to facilitate production.

Figure 34:
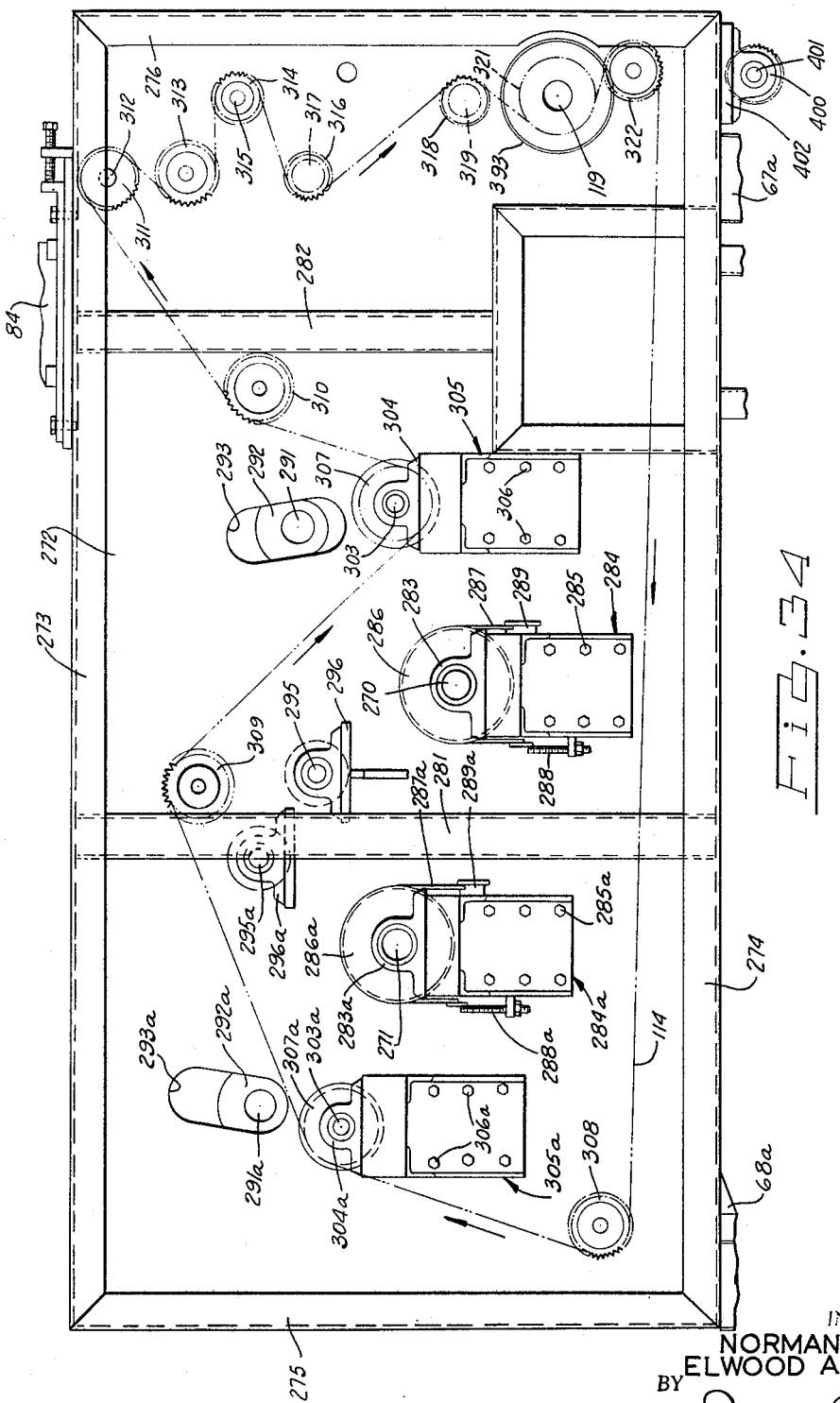
FIGURE 34 is an enlarged, fragmentary, rear elevational view of the liner processing structure illustrated in FIGURE 33.
Figure 35:
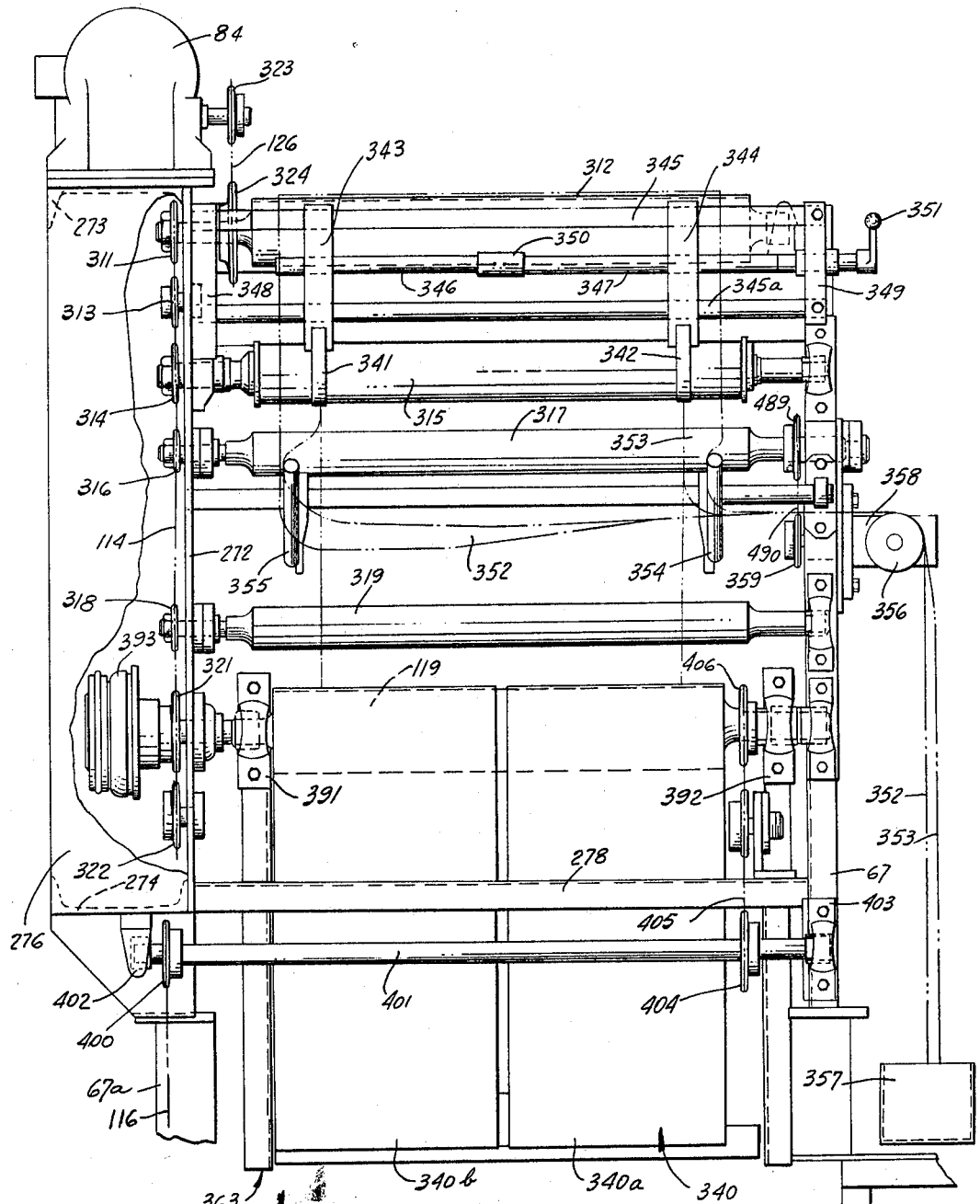
FIGURE 35 is an enlarged, left end elevational view of the liner processing structure illustrated in FIGURE 33, taken along the line 35—35 thereof, and looking in the direction of the arrows.

The rolls of liner stock 110 and 111 are supported for rotation by the shafts 270 and 271 which are mounted on the liner processing means frame rear wall 272. As shown in FIGURES 34 and 35, the frame rear wall 272 comprises an elongated vertical metal plate which is welded to a rectangular channel frame comprising the upper and lower longitudinal channels 273 and 274, respectively, and the vertical end channels 275 and 276. The last mentioned frame structure is fixedly mounted on the conveyor rear vertical channels 67a and 68a by any suitable means, as by welding.

As shown in FIGURE 33, the front side of the liner processing means frame includes the upwardly extended conveyor frame members 67 and 68. As shown in FIGURES 33 and 35, the vertical frame member 67 is connected in a fixed manner with the rear vertical frame plate 272 by means of the transverse, vertically spaced apart channel members 277 and 278.

The front and rear vertical frame members 68 and 68a are connected by the transverse angle bar 279 and plate 280. As shown in FIGURE 34, the frame plate 272 is also provided with the vertical stiffener channels 281 and 282.

As shown in FIGURE 34, the liner roll shaft or mandrel 270 is rotatably mounted in suitable pillow blocks 283 which are mounted in a fixed manner on the bracket 284. The bracket 284 is fixed to the rear side of the frame plate 272 by any suitable means, as by being bolted on, as indicated by numeral 285. A brake drum 286 is mounted on the roll shaft 270 and is engaged on the upper portion of its periphery by the brake band 287 for braking the roll shaft 270 during operation of the liner processing means. The brake band 287 is connected in a fixed manner to one side of the bracket 284, as indicated by the numeral 289. The brake band 287 is trained around the brake drum 286, and the other end thereof is connected to the adjustment screw 288 for adjusting the tension of the brake band 287. The liner roll shaft 271 is supported on the frame plate 272 in the same manner as the liner roll shaft 270 and the corresponding supporting structure has been marked with similar reference numerals followed by the small letter "a."

As shown in FIGURES 2 and 33, the strip of separating material 290 which is unwound from the roll of liner stock 110, as the liner stock is used, is wound on the idler roll 291. As shown in FIGURE 34, the rear end of the roll 291 is reduced and is journaled in the carrier plate 292 which is slidably mounted for vertical arcuate movement in the slot 293 formed in the plate 272. A lever arm 294 is shown in FIGURE 33 and one end of this arm is mounted by means of the rotatable shaft 295 on suitable pillow blocks 296 supported on the frame plate 272. The other end of the lever arm 294 is connected to the idler roll 291 in a suitable hinged manner. The lever arm 294 is adapted to move the idler roll 291 between a lower operative position and an upper inoperative position. The lever arm 294 is adapted to be moved by means of the air cylinder generally indicated by the numeral 297. The air cylinder 297 is mounted in a hinged manner at the point 298 to the bracket 299. The bracket 299 is fixed on the front side of the plate 272. The cylinder rod 300 is hinged at the point 301 to a suitable bracket which depends from the arm 294. The idler roll 291a is mounted in a similar manner and the corresponding structure has been marked with similar reference numerals followed by the small letter "a."

When the air is released from the hold-up Cylinder 297, the lever arm 294 will move by gravity downwardly and bring the roll 291 into rolling engagement with the drive roll 302. As shown in FIGURE 34, the drive roll 302 is carried on the shaft 303 which is supported in a rotatable manner on suitable pillow blocks 304. The pillow blocks 304 are supported by a suitable bracket 305 which is fixed to the plate 272 by the bolt and nut means 306. A sprocket 307 is fixed on the shaft 303 and is disposed on the rear side of the plate 272. The sprocket 307 is engaged with and driven by the drive chain 114. As shown in FIGURES 33 and 34, a similar drive roll engages the liner separating material idler roll 292, and the similar parts are marked with corresponding reference numerals followed by the small letter "a."

The drive chain 114 is driven by the electric drive motor 84 by means of the following described structure. As shown in FIGURE 34, the drive chain 114 is trained around a plurality of sprockets mounted on the rear side of the plate 272. The drive chain 114 is an endless chain. The lower run of the drive chain 114 passes along the lower end of the plate 272 and it moves to the left, as viewed in FIGURE 34. The drive chain 114 then passes around the idler sprocket 308 and moves upwardly into driving engagement with the sprocket 307a. The drive chain 114 then is trained successively around the idler sprocket 309, the drive sprocket 307, the idler sprocket 310 and the drive sprocket 311. The drive chain 114 then is trained downwardly and successively around the idler sprocket 313, the drive sprocket 314 on the liner trim shaft 315, the drive sprocket 316 on the idler roll 317, the drive sprocket 318 on the idler roll 319, the drive sprocket 321 on the liner storage conveyor drive roll 119 and thence around the idler sprocket 322 and again into the lower run or portion thereof. The idler sprockets 308, 309, 310, 313 and 322 are mounted suitably in a rotatable manner on the rear side of the plate 272.

As shown in FIGURES 2 and 35, the electric drive motor 84 is provided with a drive sprocket 323 on the output shaft thereof which is meshed with a drive chain 126 that is trained around the sprocket 324 mounted on the liner drive conveyor roll 312. The electric drive motor 84 is a low speed motor.

The drive motor 84 drives the horizontal conveyor, generally indicated by the numeral 112 (FIG. 33), which functions to unroll the liner stock 113 for processing the same. The drive roll 312 of the horizontal conveyor 112 is mounted operatively between the rear frame plate 272 and one end of the longitudinally extended channel member 325. Operatively mounted between the other end of the channel 325 and the plate 272 is the upstream conveyor idler roll 326. As shown in FIGURE 33, the inner or right end of the channel 325 is supported by the transverse channel 328, which is fixed at the rear end thereof to the plate 272. Trained around the conveyor rolls 324 and 326 is an endless, suitable conveyor belt 327 which is preferably made of the same material as the main conveyor belt 74. As shown in FIGURE 2, the liner stock 113 is fed upwardly from the feed roll 110 and around the upstream end of the conveyor 112 from where it is conveyed to the left end of the liner processing structure, the details of which are shown in FIGURES 33 and 35.

As shown in FIGURES 33 and 37, the liner processing structure includes a control means for stopping the automatic operation of the liner processing means 16, and this control is indicated generally by the numeral 329. The stop control 329 includes a roller 330 which is supported between the channel 325 and the plate 272 at the upstream end of the conveyor 112. The liner stock 113 is adapted to pass over the roller 330. The stop control 329 further includes a transverse shaft 331 which is supported in a rotatable manner between the two plates 332 and 333. The plate 333 is supported by the plate 272. The plate 332 is supported by the arm 334 which is connected to the plate 272. The stop control 329 further includes the pair of spaced apart arms 335 and 336 which are mounted on the transverse shaft 331. A pair of rollers 337 and 338 are carried rollably on the outer ends of the arms 335 and 336, respectively, and are adapted to normally ride on the upper surface of the liner stock 113. When the trailing end of the liner stock 113 passes beyond the roller 330, the rollers 337 and 338 will engage the roller 330 and actuate electrically a stop control circuit. The operator thus is notified that the liner processing means 16 must be serviced and the storage liner roll 111 must be spliced to the trailing end of the liner stock 113.

As shown in FIGURE 33, the liner processing means 16 is provided with a hot knife or heated bar cutter, generally indicated by the numeral 339. This knife is mounted operatively over the upstream end of the horizontal conveyor 112 and is adapted to cut the trailing end of the expiring roll of liner stock square and the leading end of the new roll of liner stock square. The heated knife 339 operates in the same manner as the hereinafter described second hot knife cutter, generally indicated by the numeral 122, and which is disposed over the storage conveyor 109.

The liner stock 113 is adapted to pass to the left, as viewed in FIGURE 33, over the conveyor 112 from where it is passed downwardly and around the idler roll 317 and thence back upwardly and around the edge trimming roll 315. As shown in FIGURES 33 and 35, the liner stock 113 passes downwardly from the trim roll 315 and around the idler roll 319 and then onto the conveyor belt 340 of the storage conveyor 109. The idler rolls 317 and 319 are supported in suitable journal members on the plate 272 and the front frame member 67, as shown in FIGURES 33 and 35. The trim roll 315 is supported similarly in suitable journal members mounted on the plate 272 and the frame member 67.

The liner processing means 16 is provided with an automatic liner edge trimming means, as shown in FIGURES 33 and 35. The trimming means includes the pair of spaced apart, circular cutters or slitter knives generally indicated by the numerals 341 and 342 in FIGURE 35. The cutters 341 and 342 are supported in an operative manner on the vertical carrier bars 343 and 344 which are mounted slidably on the spaced transverse shafts 345 and 345a. The carrier bars 343 and 344 are mounted threadably on the aligned threaded shafts 346 and 347. The outer ends of the shafts 345, 345a, 346 and 347 are mounted operatively in the supporting brackets 348 and 349 which are fixed to the front and rear sides of the liner processing frame structure. The threaded shafts 346 and 347 are joined at the inner ends thereof by the coupling member 350, and one of these shafts is provided with left hand threads and the other with right hand threads, whereby when the hand adjustment knob 351 is actuated, the knife carrier bars 343 and 344 are actuated inwardly or outwardly to the desired adjusted positions.

The slitter knives 341 and 342 may be of any suitable type. A suitable knife is available on the market under the trade name Pneu-Cut, Model No. 793, and it is sold by the Cameron Machine Company of Dover, N.J. The last mentioned slitter knife is adapted to be spring retracted from the hardened steel roller 315 to an inoperative position and air operated toward the roller 315 into an operative cutting position.

As shown in FIGURE 35, the liner trimmed edges 352 and 353 pass downwardly around the guide bars 354 and 355, respectively, and thence outwardly over the power driven roller 356 and then downwardly into a catch basket 357. The roller 356 is driven by the right angle drive means 358 which is driven by the sprocket 359. The sprocket 359 is driven by the drive chain 490 which is connected to the drive sprocket 489.

As shown in FIGURES 33 and 36, the liner stock is moved by the inclined conveyor belt 340 to the right until the leading edge breaks a light ray directed from below the belt upwardly to a suitable electric eye receiver cell mechanism, generally indicated by the numeral 360. The electric eye receiver cell mechanism 360 is supported on the arm 361 which is mounted on the threaded shaft 362 to permit adjustment of the electric eye mechanism longitudinally of the conveyor belt 340 for detecting various liner lengths. The conveyor belt 340 comprises the front portion or strip 340a which is spaced apart from the rear portion or strip 340b. The electric eye receiver cell mechanism 360 is disposed over the open space between the conveyor belt portions 340a and 340b to permit coaction with a suitable light source disposed beneath the conveyor belt.

As shown in FIGURE 33, the liner storage conveyor 109 includes the drive roll 119 which is mounted in suitable journal members on the left end of the liner processing frame structure. The conveyor 109 includes a suitable elongated, inclined frame structure 363 around which is passed the endless conveyor belt 340. The downstream end of the conveyor 109 includes the idler roll 364. A pair of suitable spaced apart idler rolls 365 and 366 are mounted on the lower side of the conveyor frame 363 to engage the lower run of the conveyor belt 340. A pair of conveyor belt tightener rollers 367 and 368 are mounted beneath the conveyor belt 340, on the bracket structures 369 and 370, respectively, for operative engagement with the conveyor belt 340.

A hot knife cutter, generally indicated by the numeral 122 is mounted operatively over the liner storage inclined conveyor 109, and is adapted to be operated by a suitable air cylinder 123. The hot knife cutter 122 cuts the liner stock 113 into the proper length liners, indicated by the numeral 124 in FIGURES 2 and 5.

As shown in FIGURES 33 and 36, the hot knife cutter 122 includes a conventional electrically heated knife 371 which is disposed transversely over the liner stock 113. The knife 371 is mounted on the carrier cross bar 379 which is hinged by means of the arms 372 and 373 on the transverse shaft 374. The ends of the shaft 374 are journalled in suitable bearing members 375 and 376 which are mounted on opposite sides of the conveyor frame structure 363. The cylinder rod 377 is connected at the lower end thereof by means of the hinge pin 378 to the knife carrier cross bar 379. The upper end of the cylinder 123 is hinged to the cross arm 386 which is supported on the vertical angle bars 387 and 388. The angle bars 387 and 388 are fixed to the conveyor frame 363.

A first transverse stripper roller 380 is mounted in front of the knife 371 and a second transverse stripper roller 381 is mounted in back of the knife 371. The stripper roller 380 is fixed to the front ends of the arms 382 and 383. The stripper roller 381 is fixed to the front ends of the arms 384 and 385. The rear ends of the arms 382 through 385 are mounted on the shaft 374 for up and down swinging action. The knife carrier cross bar 379 is provided with the extensions 389 and 390 at the ends thereof which extend under the stripper roller arms 382 through 385 in a spaced apart relation when the knife 371 is in the down or operative position. It will be seen that when the cylinder 123 is operated to move the cylinder rod 377 downwardly, the stripper rollers 380 and 381 and the knife 371 will be moved downwardly into operative engagement with the liner stock 113. After the liner stock 113 has been cut to provide a liner 124, the cylinder 123 is reversed and the knife 371 is raised and disengaged from the liner stock 113 before the stripper rollers 380 and 381 are raised. This holddown action by the stripper rollers 380 and 381 is accomplished by the knife carrier extensions 389 and 390 engaging the underside of the arms 382 through 385 in a time delay action during the upward movement of the knife 371 to an inoperative position.

As shown in FIGURES 2 and 33, an electrostatic device 125 is positioned over the liner storage inclined conveyor 109 for electrostatically charging the trailing ends of the liners 124 as they pass thereunder, whereby they will be attracted to the belts of conveyors 14 and 109. The trailing ends of the electrostatically charged liners 124 thus are held firmly in a flat condition on the inclined conveyor belt without turning-up, and these electrostatic forces assist the proper transferring and placing of the liners 124 onto the main conveyor belt 74, as shown in FIGURE 5. A conventional electrostatic device suitable to carry out the function of the member 125 and a suitable coacting conveyor belt is shown and described in the aforementioned U.S. Patent No. 3,071,179. The disclosure of this patent is incorporated by reference herein.

The drive motor 84 drives the liner stock roller conveyor 112, the liner separating material drive rolls 302 and 302a, and the liner storage inclined conveyor 109 during the liner edge trimming and metering-to-length operations on the liner stock 113. After the liner stock 113 has been metered to the proper length onto the conveyor 109 and the hot knife cutter 122 has operated to cut the liner stock 113 to provide a liner 124, the driving connection between the liner storage inclined conveyor 109 and the aforedescribed drive chain 114 is disengaged. The inclined conveyor 109 then is connected to the main conveyor drive motor 78 for timing the operations of the main conveyor 14 and the liner storage inclined conveyor 109, by means of the following described structure. The main conveyor 14 which carries the plies 65 and 66 to the applicator means 18 thus is operated simultaneously with the liner storage inclined conveyor 109 during a ply and liner application on the tire building drum assemblies 19 and 20.

When the tire building end operator operates a suitable control the drive sprocket 321, shown in FIGURES 34 and 38, is detached from its driving connection with the rear end shaft of the liner storage inclined conveyor drive roll 119 by means of the operation of the electrical clutch 393. The conveyor drive roll 119 is journaled in suitable pillow blocks 391 and 392 on the upstream end of the inclined conveyor structure 363. The ends of the shaft supporting the drive roll 119 also are journaled in suitable bearing members on the main frame of the liner processing structure, as shown in FIGURE 35.

The main conveyor drive motor 78 operates the conveyors 14 and 109 at a faster speed than that provided to the conveyor 109 by the motor 84 during a liner metering and cutting-to-length operation. The drive motor 78 is connected in a driving relationship with the roll 119 by the following described structure. As best seen in FIGURE 38, the drive motor 78 is connected by means of the gear reduction mechanism 79 which is provided with an output shaft on which is mounted the drive sprocket 394. The drive sprocket 394 is connected by means of the drive chain 80 to the driven sprocket 395 fixed on the front end shaft of the main conveyor drive roll 81. Mounted in an operative manner on the rear end of the main conveyor drive roll 81 is a drive sprocket 397 which is connected operatively to the rear end of the drive roll 81 by means of the electrically operated clutch 396. The electrical clutches 393 and 396 may be of any suitable type. A clutch capable of carrying out the functions of the clutches 393 and 396 is one available on the market and sold by the Warner Electric Brake and Clutch Company of Beloit, Wis., Model No. 5301–749–001.

The drive sprocket 397 is connected by means of the drive chain 121 which extends downwardly and is connected in an operative manner to the driven sprocket 398 mounted on the input shaft of the right angle drive mechanism 120. As shown in FIGURES 2 and 38, the output shaft of the right angle drive mechanism 120 is connected operatively to the left end of the elongated drive shaft 117 which is disposed under the main conveyor 14, and at a position along the rear side of the tire building apparatus. The drive shaft 117 is supported in suitable bearing members indicated by the numerals 118 and 118a. The other end of the drive shaft 117 is connected in an operable manner to the input shaft of the right angle drive mechanism 115. A drive sprocket 399 is secured to the output shaft of the right angle mechanism 115 and drives the drive chain 116 which is located on the rear side of the tire building apparatus and which extends upwardly and slopes toward the right end of the apparatus, as shown in FIGURE 2. The drive chain 116 is trained around the driven sprocket 400 which is secured to a transfer shaft 401. The transfer shaft 401 is journaled in suitable pillow blocks, as 402 and 403, which are fixed on the left end of the liner processing structure, as shown in FIGURES 33 and 35. The drive sprocket 404 is fixed on the front end of the transfer shaft 401 and is connected by means of the drive chain 405 to the driven sprocket 406 mounted on the front end shaft of the conveyor drive roll 119.

The last described power drive train which connects the high speed motor 78 to the liner storage inclined conveyor 109 functions to operate the conveyor 109 in a timed relationship with the main conveyor 14 so as to dispose the liner 124 in its proper position relative to the first ply 65 and then operate the applicator means 18 so as to apply the liner 124 and the plies 65 and 66 on the tire building drum assemblies 19 and 20 in an automatic applicating operation.

LINER AND PLY APPLICATOR MEANS

The liner and ply applicator means 18, which is shown in FIGURE 2, is the applicator end of the main conveyor 14, and it is a unit in the tire building end portion of the apparatus. It is aligned vertically with the toe strip storage and applicator means 17 and it is adapted to contact the bottom of the building drum assemblies 19 and 20. The toe strip applicator means 17 is adapted to be lowered into contact with the top surface of the building drum assemblies 19 and 20.

The liner and ply applicator means 18 comprises the elongated rectangular frame 127 which is mounted hingedly by any suitable means, as by the shaft 128, on the downstream end of the conveyor 14, as shown in FIGURE 2. Operatively mounted on the front end of the applicator frame 127 is a suitable roll 129 around which is passed the main conveyor belt 78. The applicator frame 127 is shown in FIGURE 2 in the liner and ply applicating position against the bottom surface of the tire building drum assembly 20. The applicator frame 127 is movable downwardly in a clockwise direction, as viewed in FIGURE 2, to the inoperative position by means of the lever 130 which is connected at the upper end thereof to the shaft 128 and at the lower end thereof to the cylinder rod 131 of a suitable air cylinder 132. The air cylinder 132 is hinged by any suitable means, as by means of the pin 133, to the conveyor angle iron 75. A second air cylinder and lever operating structure also is mounted on the rear side of the applicator arm 127 and acts in conjunction with the air cylinder 132 and lever 130.

As shown in FIGURE 2, an electrostatic device 134 is provided on the discharge end of the conveyor 14 for charging the liner 124 and the plies 65 and 66 to facilitate their application onto the drum assemblies 19 and 20. The electrostatic device 134 would be constructed in the same manner as the electrostatic device 125. The drum assemblies 19 and 10 are grounded electrically to facilitate the electrostatic attraction between the drum assemblies and the charged liner and plies being applied thereto.

TOE STRIP APPLICATOR MEANS

The toe strip storage and applicator means is shown in detail in FIGURE 2, and FIGURES 28 through 32 of the drawings. The purpose of this device is to guide, apply and cut-to-length, automatically, narrow chafing strips of reinforcing fabric to a tire building drum assembly, as the drum assemblies 19 and 20. These strips are made from the conventional type of rubber used to encompass the portion of a tire bead ring that comes in contact with a wheel rim, in order to reduce chafing caused by friction.

As shown in FIGURES 2 and 28, the toe strip applicator means 17 includes a tubular frame, generally indicated by the numeral 135, which is open on the upper and lower ends thereof and mounted in a pivotal manner to the longitudinally extended support arms 136 and 137, at the points indicated by the numerals 138 and 139, respectively. The support arms 136 and 137 are fixed, as by welding, to the upper ends of the main conveyor vertical frame members 69 and 140. The support arms 136 and 137 are disposed horizontally in a laterally spaced apart position upwardly from the liner and ply applicator means 18. As shown in FIGURE 28, the frame 135 is substantially rectangular in plan shape and is provided with the longitudinally extended cross member 141 which supports the controls for width adjustment. The tubular frame 135 comprises the front and read transverse members 142 and 143, respectively, and the integral, longitudinally disposed left and right side members 144 and 145, respectively.

As may be seen in FIGURES 2 and 28, the toe strip applicator means 17 is actuated into operative position by means of a pneumatic cylinder, generally indicated by the numeral 146, which is mounted pivotally by means of the carrier member 147 between the horizontal, laterally spaced apart mounting brackets 148 and 149. As shown in FIGURE 28, the mounting brackets 148 and 149 are secured fixedly, as by welding, to the frame transverse member 150 which is secured fixedly between the conveyor vertical frame members 69 and 140. The pneumatic cylinder 146 is provided with a downwardly extended cylinder rod 151 which is connected pivotally by means of the pivot pin 152 to the laterally spaced apart bracket arms 153 and 154 which are secured fixedly by any suitable means, as by welding, to the cross member 141 of the tubular frame 135. FIGURE 2 shows the cylinder 146 actuated into a position to move the toe strip applicator means 17 into engagement operatively with the building drum assembly 20. The bracket members 153 and 154 form a clevis member which permits adjustment of the cylinder rod 151 relative to these bracket members to adjust the operating stroke of the cylinder 146 for positioning the toe strip applicator means 17 relative to the drum assembly 20.

The toe strips 156 are stored on suitable rolls as 155 which are mounted operatively on the tire building apparatus frame in a suitable position, as shown in FIGURE 2. The toe strips 156 are conveyed over suitable guide means to the tubular frame 135. A pair of rolls 155 are employed to store and feed a pair of toe strips 156 to the applicator structure described hereinafter.

As shown in FIGURE 28 the toe strips 156 are applied to the drum assemblies 19 and 20 by means of a pair of spaced apart, left and right toe strip applicators 157 and 158, respectively. The toe strip applicators 157 and 158 are mounted in an adjustable manner on the tubular frame 135 for adjusting the space between the pair of toe strips 156. As shown in FIGURE 28, the means for adjusting the toe strip applicator 158 comprises a pair of transversely disposed, longitudinally spaced apart, threaded shafts 159 and 160. The toe strip applicator 158 is supported on the longitudinally extended carriage 162, as shown in FIGURE 28. The threaded shafts 159 and 160 are threaded suitably through the carriage 162 of the right toe strip applicator 158. The outer ends of the threaded shafts 159 and 160 are supported suitably in a rotatable manner on the tubular frame side member 145. The threaded shafts 159 and 160 are provided on the outer end thereof with suitable sprockets 163 and 164, respectively, which are fixed thereon and interconnected by the endless chain 165. A drive sprocket 166 is connected operatively to the chain 165 for actuating the same. The sprocket 166 is fixed on the inner end of the shaft 166a which is journaled in the pillow block 166b. A hand wheel 166c is fixed on the outer end of the shaft 166a for rotating the same. As shown in FIGURE 28, the inner ends of the shafts 159 and 160 are connected in an operative manner to the couplings 167 and 168, respectively.

A second pair of threaded shafts 169 and 170 are threaded suitably through the carriage 161 which carries the left to strip applicator 157. The outer ends of the shafts 169 and 170 are journaled suitably in the tubular frame side member 144, and the inner ends thereof are mounted rotatably in a pair of suitable journal members as 227 (FIG. 32) on the lower side of the cross member 141. The shafts 169 and 170 extend through the journal members 227 and are connected operatively to the couplings 167 and 168 (FIG. 28), respectively. The shafts 169 and 170 also are connected operatively by means of a suitable endless chain 171 and a pair of sprockets 171a and 171b.

It will be seen that when the couplings 167 and 168 are engaged operatively, the toe strip applicators 157 and 158 may be moved toward or away from each other, in accordance with the direction of rotation of the hand wheel 166c. This action is accomplished by providing the shafts 169 and 170 with left hand threads and the shafts 159 and 160 with right hand threads. If it is desired to move the left toe strip applicator 157 out of position relative to the centerline of the applicator means, it may be accomplished by operating the hand wheel 166c as described above. After the applicator 157 has been moved to the left, as viewed in FIGURE 28, the couplings 167 and 168 would be unlocked or disconnected and the right toe strip applicator 158 moved back individually by a reverse rotation of the hand wheel 166c. The position of the right toe strip applicator 158 thus may be changed without changing the location of the left toe strip applicator 157. As shown in FIGURE 28, the toe strip applicator carriages 161 and 162 each are supported slidably on the front and rear transverse rails 172 and 173, respectively, by means of a pair of hangers as 174.

The left toe strip applicator 157 now will be described in detail and the corresponding parts of the right toe strip applicator 158 will be marked with the same reference numerals followed by the small letter "a." As shown in FIGURES 28, 29 and 32, the left toe strip applicator 157 includes a base plate 175 which is connected fixedly to the hangers 174 and through which are mounted threadably the shafts 169 and 170. A slide assembly, generally indicated by the numeral 176, is carried by a side plate 177 which is bolted to the base plate 175 by means of the angular projections 178 and 179. A cylinder 180 for actuating the slide assembly 176 is mounted fixedly on the vertical mounting plate 181. The mounting plate 181 is mounted fixedly on the base plate 175. The slide assembly 176 is connected to the rod 182 of the cylinder 180 by means of a beveled edge plate 183. A shown in FIGURE 29, the plate 183 is mounted in the flanged wheels 184 which are journaled suitably by means of the shafts 185 in spaced apart positions in the side plate 177.

As shown in FIGURE 32, a guide 187 and support plates 188 and 189 are fastened to plate 183 by means of a bracket 190 and screws 186 and 186a. A spring loaded pawl 191 is mounted pivotally at 192 to the plate 183 and holds the toe strip 156 against the plate 189. The toe strip 156 is held against the plate 189 in order to feed the toe strip 156 to the vacuum holder after cutting, as described hereinafter.

The toe strip applicator 157 further includes a cutter head, generally indicated by the numeral 193, as shown in FIGURES 29 and 32. The cutter head 193 comprises a block 194 which is connected threadably to the rod 195 of the air cylinder, generally indicated by the numeral 196. A guide plate 197 is attached to the block 194 by means of the pin 198. A cutter blade 199 is bolted by means of the bolts 200 to the guide plate 197 to facilitate removal of the blade 199 for sharpening or replacement purposes. The air cylinder 196 is bolted by means of the bolts 201 to the top plate 202 which is mounted on the knife guide 203. The knife guide 203 is carried on the base plate 175. A cutting block 204 coacts with the knife blade 199 to sever the toe strip material 156. As shown in FIGURE 32, a leaf spring 205 is mounted on the base plate 175 and engages the cutting block 204. The leaf spring 205 functions to prevent the toe strip material 156 from sticking to the cutting block 204.

The device for holding the end of the toe strip material 156 and for applying it to the building drum assemblies 19 and 20 is shown in FIGURES 30 and 31. An arm 206 is mounted pivotally at one end thereof, to the side plate 207 at the point 208. The opposite end of the arm 206 is welded to the holder 209. An axle shaft 210 is mounted slidably in the bore 211 in the holder 209. The shaft 210 is secured in the bore 211 by means of the bolt 212 which is mounted threadably through the split portions 213 of the holder 209. The outer end of the shaft 210 is drilled as indicated by the numeral 214 to accommodate a vacuum line. A plurality of radial passages 215 are drilled through the outer end of the shaft 210 to connect with the vacuum line hole 214. A roller sleeve 216 is mounted rotatably about the outer end of the shaft 210 by means of suitable bearings as 217. The roller sleeve 216 is provided with a plurality of radially disposed holes 218 around its circumference. The arm 206 is adapted to be adjusted about its pivot mounting 208 by means of the adjusting screw 219 which is mounted threadably in the arm 220. A spring 221 normally biases the arm 206 downwardly, and it is disposed between the arm 222 and the roller arm 206.

The operation of the toe strip applicator means 17 may be described as follows. Three requirements are necessary. The program sequence timer (not shown) for the building end of the apparatus must be indexed to demand toe strip application, the entire apparatus must be put on automatic control, and the drum assembly, 19 or 20, to be processed must be moved into position by the appropriate push button switch which controls the turret for the respective drum assembly to move it into the common building location at the right end of the apparatus.

Assuming slides 176 and 176a have previously extended to place toe strip material at roller sleeves 216 and 216a and that the aforementioned requirements are fulfilled, the cylinder 146 is operated to rotate the tubular frame 135 so as to bring the applicator roller sleeves 216 and 216a into contact operatively with the upper surface of the building drum assembly. The movement of the tubular frame 135 releases the limit switch 223 which is mounted on the support arm 137, as shown in FIGURE 28. At the end of the stroke of cylinder 146, the limit switches 224 and 224a are actuated. The signals from the limit switches 224 and 224a actuate the cylinders 180 and 180a to retract the slide assemblies 176 and 176a to the position shown in FIGURES 28 and 32, which in turn actuates the limit switches 225 and 225a causing the building drum assembly to begin a slow rotation for applying the toe strips. After approximately one revolution of the drum assembly, the rotation stops momentarily and the air cylinders 196 and 196a operate to sever the toe strips by actuating the cutter heads 199 and 199a downwardly. The downward movement of the cutter heads 199 and 199a releases the limit switches 226 and 226a which initiates a timed cutting cycle during which the drum does not rotate.

After the timed cutting cycle is completed, the cutter heads 199 and 199a return to the up or retracted position and the drum assembly resumes rotation. When the cutter heads 199 and 199a are fully retracted, they actuate the limit switches 226 and 226a (FIGURE 29) and the tubular frame 135 returns to the inoperative position to elevate the rollers 216 and 216a out of engagement with the building drum assemblies through the action of cylinder 146. The slide assemblies 176 and 176a then move forward to transfer the leading edges of the toe strips to roller sleeves 216 and 216a preparatory to applying the toe strips 156 to the alternate drum assembly for a subsequent tire carcass. At this point, the remainder of the operations involved in completing the tire carcass take place as described hereinafter.

As shown in FIGURES 30 and 31, the perforated rollers 216 and 216a function to hold the severed ends of the toe strips 156 by means of the vacuum provided through the vacuum holes 214 and 214a. It will be understood that the toe strips 156 are fed from the storage rolls 155 to the guide members 187 and 187a by means of a pair of guide rollers, 407 and 407a, located on the rear ends of the carriages 161 and 162 and shown in FIGURE 28.

TIRE BUILDING DRUM ASSEMBLIES

The tire building drum assemblies 19 and 20 are identically constructed and the assembly 20 will be described in relation to the making of a tire carcass, and the corresponding parts of the assembly 19 will be marked with the same reference numerals followed by the small letter "a." The term "tire building drum" as used in the specification and in the claims includes the usual expandable central drum and the usual two auxiliary drums which are each provided with an expandable bladder means. The term "tire building drum assembly" includes not only the tire building drum but also the turn-over cages and the turrets for supporting the same. Any suitable tire building drum may be used. A suitable tire building drum is shown and described in United States Patent No. 2,565,071, issued to L. C. Frazier. As shown in FIGURE 1, the drum assembly 20 comprises the expandable central drum 228 which is provided at the opposite ends thereof with the usual auxiliary drums 229 and 230. The drums 228, 229 and 230 are mounted operatively on the shaft 231 for rotation of the drums in the conventional manner.

As shown in FIGURE 39, the drum assembly shaft 231 is journaled in suitable bearings in the rotatable turret generally indicated by the numeral 232. The shaft 231 is provided with an axial passage 235 which conveys pressurized air from a suitable source into the expandable central drum 228 and the bladders of the two auxiliary drums 229 and 230 during a tire building operation.

The turret 232 includes a suitable hollow housing in which is mounted the rotatable vertical shaft 236, as shown in FIGURE 40. The upper end of the turret shaft 236 is supported rotatably in a suitable ball bearing structure, indicated by the numeral 237 and which is mounted in a suitable bearing housing 238 supported by the internal housing stiffener members or plates 239 and 240. The turret shaft 236 is supported further by the lower ball bearing member 241 carried in a suitable bearing housing 242 and which is supported by the bottom end wall structure 414 of the turret. The turret shaft 236 extends downwardly from the turret 232 and is provided with a suitable ground engaging base portion 243.

As shown in FIGURES 1, 11 and 39, the turret 232 is provided with the annular, inboard turn-over cage 233 which is mounted about the shaft 231, and the annular, outboard turn-over cage 234 which is constructed in the same manner as the inboard turn-over cage 233. The turn-over cages 233 and 234 are mounted operatively on the turret 232 as more fully described hereinafter. The outboard turn-over cage 234 is adapted to be used with the drum assembly 19 when it is swung into the common tire carcass forming position at the downstream end of the main conveyor 14. A similar outboard turn-over cage 234a on the left turret 232a is adapted to function with the drum assembly 20 when it is swung into the common tire carcass forming position, as shown in FIGURE 1. Each of the turn-over cages 233, 233a, 234 and 234a is provided with a suitable bead ring holding means, as more fully described hereinafter. As shown in FIGURE 41, the turret 232a is mounted for rotation about the turret shaft 236a in the same manner as the turret 232.

The drum assemblies 19 and 20 are constructed and arranged to be reciprocated simultaneously between the tire carcass forming position and the tread applicator position by means of the following described structure. As shown in FIGURE 1, the left turret 232a is provided on the inboard end thereof with the bracket 244 when it is disposed in the position shown in FIGURE 1 and FIGURE 41. The bracket 244 is secured fixedly to the underside of the turret 232a, towards the rear end thereof. A clevis 245 is connected rotatably to the bracket 244 by means of the hinge pin 246. Threadably mounted on the inner end of the clevis 245 is the elongated cylinder rod 247 which extends into the hydraulic cylinder 248 in an operative manner. As shown in FIGURE 41, the hydraulic cylinder 248 is mounted pivotally by means of the pivot pin 249 in the pivot bracket generally indicated by the numeral 250. As shown in FIGURE 40, the pivot bracket 250 includes the lower end wall 251 and the upper end wall 252 in which the lower and upper ends, respectively, of the pivot pin 249 are mounted in a rotatable manner.

The hydraulic cylinder 248 is adapted to be supplied with pressurized hydraulic oil from the conventional pressurized hydraulic oil source generally indicated by numeral 253 in FIGURE 1. The hydraulic oil source 253 would include the usual hydraulic oil reservoir and pump for supplying hydraulic oil under pressure to the hydraulic cylinder 248. It will be seen that when the hydraulic cylinder 248 is operated to move the cylinder rod 247 into the cylinder 248, or to the left as viewed in FIGURE 41, the turret 232a will be rotated in a counter-clockwise direction to pivot the outboard turn-over cage 234a into the inoperative position, and the drum assembly 19 into the common tire carcass forming position. When the hydraulic cylinder 248 is operated in a reverse direction, so as to move the cylinder rod 247 out of the cylinder 248, the turret 232a will be returned to the position shown in FIGURE 41.

The turrets 232 and 232a are interconnected by the following described structures so that the two turrets will rotate simultaneously. The turrets 232 and 232a are interconnected by means of the elongated shaft 254 which is shown in FIGURES 39, 40 and 41, and which is disposed beneath the front ends of the turrets. As shown in FIGURE 39, the right end of the shaft 254 is connected to the bracket 255 by means of the hinge pin 256. The left end of the shaft 254 is connected to a similar bracket 257 which is mounted fixedly on the lower side of the turret 232a. The shaft 254 is connected to the bracket 257 by means of the hinge pin 258 (FIGURE 41).

It will be seen that when the turrets 232 and 232a are disposed in the positions shown in FIGURE 1 that the bracket 257 is disposed perpendicular to the shaft 254, and the bracket 255 is disposed in alignment with the shaft 254. In the last mentioned position the bracket 255 is adapted to abut the adjustable stop bar 259 (FIG. 40) which is mounted adjustably on the bracket 260 formed integral with the turret pivot shaft base 243. It will be seen that when the hydraulic cylinder rod 247 is moved to the left into the cylinder 248, as viewed in FIGURE 41, the turret 232a will be rotated counterclockwise and the shaft 254 will function to simultaneously rotate turret 232 in a counterclockwise direction. The drum assembly 20 thus will be moved from the common tire carcass forming position to its respective tire tread applicator position. Simultaneously, the drum assembly 19 is rotated from its respective tire tread applicator position to the common tire carcass forming position. The reverse action occurs when the cylinder rod 247 again is moved out of the cylinder 248. It will be understood, that the cylinder 248 oscillates about the vertical hinge pin 249 during a turret rotating operation.

The turn-over cage 233 with its bead ring processing structure is shown in detail in FIGURES 8 through 19 and FIGURE 39. The turn-over cage 233 is provided with the usual bladder turn-over shell 263 which is supported for reciprocating action by the guide rod 261 and the guide rod 262, as shown in FIGURE 8. The shell 263 is supported further and reciprocated by the power cylinder rod 264.

As shown in FIGURES 39 and 40, the guide rods 261 and 262 extend through the turret 232 and are journaled in suitable supporting bearing members, generally indicated by the numerals 265 and 266, respectively. The power cylinder rod 264 is mounted operatively in the air cylinder generally indicated by the numeral 267 in FIGURE 39.

The guide rod 261 is connected to the turn-over cage shell 263 by means of the connecting structure shown in FIGURE 9. The shell 263 is provided with the boss 268 through which is formed the horizontal bore 269. A sleeve member 408 is mounted in the bore 269 and held in place by a plurality of bolts 409. A sleeve bushing 410 is mounted in the sleeve member 408 and it is adapted to receive the reduced outer end 411 of the guide shaft 261. The shaft reduced end 411 is threaded at its outer end and is secured in place in the boss 268 by means of the lock washer 412 and the nut 413.

As shown in FIGURES 8 and 39, the turn-over cage shell 263 is provided with the boss 415 in which is formed the bore 416 for the reception of the outer end of the guide rod 262. The boss 415 is slotted, as indicated by the numeral 417, and the portions of the boss adjacent the slot 417 are drawn together by means of a plurality of suitable bolts 418 for gripping the guide rod 262 for drawing the portions of the boss 415 together to secure the end of the guide rod 262 in the bore 416.

As shown in FIGURES 8 and 11, the outer end of the power cylinder rod 264 is connected to the turn-over cage shell 263 in the same manner as the guide rod 261. The outer end of the power cylinder rod 264 is mounted in a suitable bore in the boss 419 and is held in place in said bore by means of the lock washer 420 and the lock 421.

The turn-over cage shell 263 supports the various components and controls for the turn-over cage operations. As shown in FIGS. 8 and 11, the turn-over cage shell 263 is provided with six bead ring holders, each generally indicated by the numeral 422. The bead ring holders 422 are mounted rotatably in equally spaced positions about the periphery of the turn-over cage shell 263. Each of the bead ring holders 422 is provided with three bead ring gripping members 423, 424 and 425 for fabricating, for example, thirteen, fourteen or fifteen inch tires, respectively. As shown in FIGURES 8 and 9, the bead ring holders 422 are each mounted fixedly on a horizontal shaft 426. Each of the shafts 426 are supported rotatably by a pair of spaced apart bearings 427 and 428 which are mounted in a housing 429 formed on the periphery of the turn-over cage shell 263. A pinion gear 430 is keyed to each of the shafts 426 and they are adapted to mesh with the external ring gear 431. As shown in FIGURE 9, the ring gear 431 is mounted rotatably in the annular groove 432 which is formed around the turn-over cage shell 263. A retainer ring 433 secures the ring gear 431 in the groove 432 in a sliding relationship with the turn-over cage shell 263. The retainer ring 433 is secured in place by any suitable means, as by means of the screws 434, shown in FIGURE 8.

FIGURE 8 shows the bead ring holders 422 turned to an operative position for holding a bead ring 435. FIGURE 11 shows the bead ring holders 422 turned to the inoperative position. The bead ring holders 422 are pivoted between their operative and inoperative positions by means of the air cylinder, generally indicated by the numeral 436, and which is shown in FIGURES 8, 11 and 39. The cylinder 436 is carried in the frame member 437 which is mounted rotatably by a pair of shafts 438 between a pair of brackets 439 which are fixed on the periphery of the turn-over cage shell 263. The cylinder 436 is provided with the cylinder rod 440 which has fixed on the outer end thereof the connector member 441. The connector member 441 is connected by means of the pivot pin 442 to the arm 443 which is keyed to the rear end of one of the shafts 426 of the bead holders 422. It will be seen that when the cylinder rod 440 is moved to the retracted position as shown in FIGURE 11, the bead ring holders 422 will be pivoted to the inoperative position. When the cylinder rod 440 is moved to the extended position as shown in FIGURE 8, the bead ring holders 422 will be in an operative bead ring holding position. It will be understood that the arm 443 may be disconnected from the shaft 426 when it is desired to adjust the bead ring holders 422, relative to the cylinder rod 440, to hold a different size bead ring 435.

As shown in FIGURES 39 and 40, the turn-over cage 234 is constructed in the same manner as the cage 233 and it is mounted on the turret 232 in the same manner. The turn-over cage 234 is supported by the guide rods 444 and 445 which are mounted in suitable support bearings 446 and 447, respectively, in the turret 232. The turn-over cage 234 is actuated by the power cylinder rod 448 which is mounted operatively in the air cylinder 449 mounted in the turret 232. The guide rods 444 and 445, and the power cylinder rod 448 are connected to the turn-over cage 234 in the same manner as the guide rods 261 and 262, and the power cylinder rod 264 are connected to the turn-over cage 233. The turn-over cage 234 is provided with six bead ring holders, generally indicated by the numeral 450, which are mounted rotatably on the cage 234 in the same manner as the bead ring holders 422 on the turn-over cage 233. The bead ring holders 450 are adapted to be rotated between the operative and inoperative positions by means of the power cylinder 451 which is constructed and operated in the same manner as the cylinder 436 on the turn-over cage 233. It will be seen that the turn-over cage 233 is disposed on the vertical inboard side of the turret 232, and that the cage 234 is disposed on the vertical outboard side of the turret 232. The turn-over cages 233 and 234 are disposed on the same horizontal plane, but their axes of reciprocation are disposed perpendicular to each other.

As shown in FIGURE 39, the drum assembly shaft 231 is rotated selectively by the electric motors 452 or 453. The electric motor 452 is supported on the top of the turret 232 in a suitable manner and is connected operatively to the shaft 231 by a plurality of drive belts 454. The motor 452 rotates the drum assembly 20 at a speed of approximately 280 r.p.m. during the application of the liner and ply material to the drum assembly. The electric motor 453 drives the drum assembly 20 at a speed of approximately 12 r.p.m. during the application of the toe strips to the drum assembly. The motors 452 and 453 are adapted to be connected selectively to the shaft 231 in the proper timed sequence by any suitable clutch means, as for example, the clutch mechanisms generally indicated by the numerals 456 and 457, respectively.

The motor drive belts 454 and 455 extend down through suitable holes 458 and 459 formed in the top wall of the turret 232, and are mounted around the pulleys 460 and 461, respectively. The pulleys 460 and 461 are seen in FIGURE 40 through the opening 462 formed in the rear end of the turret 232.

As best seen in FIGURE 14, the turn-over cage shell 263 is provided with a stepped internal circular chamber which is open at each end thereof. The front portion of this chamber is indicated by the numeral 463 and the rear portion is indicated by the numeral 464. It will be seen that the rear portion 464 is formed to a larger diameter than the front portion and is separated from the same by the annular shoulder 465. The annular shoulder 465 is engaged by the bladder 470 of the adjacent coacting auxiliary drum when it is inflated so as to produce an axial force on the cage shell 263 which is directed toward the drum and assists the inward movement of the turn-over cage and eliminates the necessity of a large size, high pressure cylinder to operate the power cylinder rods 264, 264a, 448 and 448a. The shell 466 of the turn-over cage 234 also is provided with a similar internal stepped chamber incorporating the small and large diameter portions 467 and 468, respectively, separated by the annular shoulder 469. It will be understood that the shells for the turn-over cages 233a and 234a are constructed in the same manner as the turn-over cage shells 263 and 466, respectively.

The turn-over cage shells 263, 263a, 466 and 466a are adapted to carry various control means for controlling the operation of the turn-over cages in conjunction with the operation of the drum assemblies 19 and 20 during a tire carcass forming operation. As shown in FIGURES 12 and 39, the turn-over cage 233 is provided with the low voltage contact 471 which is mounted on the contact arm 472. The contact arm 472 is disposed on the outer side of the turn-over cage shell 263 and it is mounted for limited rotation on the outer end of one of the bead holder shafts 426. The contact arm 472 is fixed on the bearing member 481 which is carried on a rearward extension of the last mentioned bead holder shaft 426, and the bearing member 481 frictionally engages shaft 426 for limited rotation therewith. A bolt 482 carried by housing 429 extends through a suitable arcuate slot 483 formed on the outer end of arm 472. Bolt 482 and slot 483 co-operate in limiting (e.g., to 15°) the amount through which the arm 472 can be rotated relative to the shell 263 when the bead holder shaft 426 rotates.

The turn-over cage 233a is provided with a similar contact 471a carried on a contact arm 473a as shown in FIGURE 41. As shown in FIGURE 39, the turn-over cage 234 is provided with a similar low voltage contact 484 carried on the contact arm 485. As shown in FIGURE 41, the turn-over cage 234a also is provided with a low voltage contact 484a which is carried on the contact arm 485a. The low voltage contacts 471, 471a, 484 and 484a abut a predetermined stop (not shown) on the outer ends of the auxiliary drums during the inward movement of the turnover cages in a bead ring locating operation. For example, after the liner 124 and the plies 65 and 66 have been assembled on the drums 228, 229 and 230 of the drum assembly 20, when it is in the position shown in FIGURE 1, the drums 228, 229, and 230 rotate until the last mentioned stops in the outer ends of the auxiliary drums 229 and 230 are in axial alignment with the low voltage contact 471 on the turn-over cage shell 263 and the low voltage contact 484a on the turn-over cage shell 466a, respectively. The cylinders 267 and 449a are then actuated and their respective cylinder rods 264 and 448a are moved outwardly to actuate the turn-over cages 233 and 234a toward the auxiliary drums 230 and 229, respectively. The turn-over cages 233 and 234a continue to move inwardly over the auxiliary drums until the aforementioned stops on the auxiliary drums make contact with the low voltage contacts 471 and 484a. The turn-over cage actuating cylinders 267 and 449a are then stopped automatically and the bead rings 435, which are carried by the turn-over cages 233 and 234a, are located in a position over the cylindrical band formed on the drum assembly 20, and in particular over the respective bladders 470 on the auxiliary drums 229 and 230. The low voltage circuit energized by the contacts 471 and 484a actuates the air pressure means for inflating the bladders 470, As shown in FIGURES 8, 10, 11, 16 and 39, the turnover cage shell 263 carries the limit switch 479 on the periphery thereof and this switch controls a part of the operation of the auxiliary drum bladders 470. The limit switch 479 is mounted in a fixed manner on the periphery of the shell 263 and is provided with the switch arm 478. The switch arm 478 is operated by the lever 474 which is L-shaped and has the inner end thereof extended through a suitable opening in the periphery of the turn-over shell 263. As shown in FIGURE 10, the inner end of the lever arm 474 rotatably supports the roller 473. The outer end of the switch operating lever 474 is mounted in a pivotal manner by means of the pivot pin 475 on the bracket 477. The lever 474 is biased normally to the position shown in FIGURE 10 by means of the spring 476. As shown in FIGURE 41, the turn-over cage 233a is provided with a similar limit switch 479a. As shown in FIGURE 40, the turn-over cage 234 is provided with a similar limit switch 486. The turn-over cage 234a would be provided with a similar limit switch 486a.

As shown in FIGURES 8 and 11, the lever rollers 473 extend into the turn-over cages and are adapted to be engaged by the bladders 470 of the auxiliary drums when they are expanded initially, as described hereinabove. When the expanding bladders 470 engage the lever rollers 473, the limit switches 479 and 486a initiate several actions. They function to stop the admission of air under pressure to the bladders 470 and actuate suitable means for partially deflating these bladders. FIGURE 16 illustrates the bladder 470 on the auxiliary drum 230 in an inflated condition so as to engage the lever roller 473. It will be understood that the bladder 470 on the auxiliary drum 229 functions in a similar manner to operate simultaneously the limit switch 486a on the turn-over cage 234a. The upward movement of the lever roller 473 pivots the lever 474 which in turn operates the switch arm 478 to actuate the control switch 479. The operation of the switches 479 and 486a also initiates the operation of the cylinders 436 and 451a which are carried on the turn-over cages 233 and 234a, respectively.

The bead rings 435 which are carried by the turn-over cages 233 and 234a will be held by the cylindrical band on the drum assembly 20 due to the inherent tack of the coacting surfaces of the bead rings and the cylindrical band. Accordingly, when the cylinders 437 and 451a are operated, the bead ring holders on the respective turn-over cages are turned to their inoperative position as illustrated by the bead ring holders 422 in FIGURES 11 and 17 for the turn-over cages 233. When the bead ring holders on the turn-over cages 233 and 234a are rotated to the inoperative position, the shafts 426 carrying the contact arms 472 and 485a will be rotated so as to bring low voltage contacts 471 and 484a out of engagement with the previously mentioned bead locating stops on the auxiliary drums and into alignment with a second ply turn-over stop (not shown).

Figure 19:
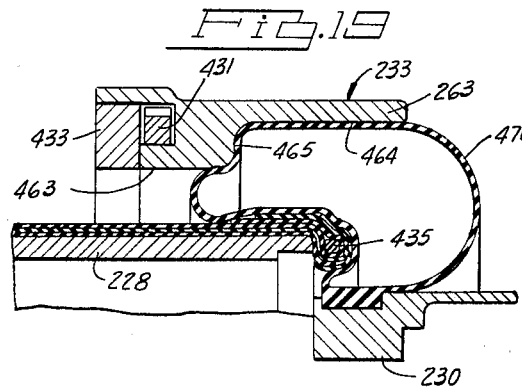
FIGURE 19 is a sectional view similar to FIGURE 18, and showing the cylindrical turn-over cage moved inwardly to a position over the drum to complete the ply turn-up operation.

Air under pressure is then admitted at this point into the central drum 228 to expand the same radially outward, as shown in FIGURE 18. The cylinders 267 and 449 which move the turn-over cages 233 and 234a inwardly over the drum assembly 20 are controlled so as to permit these cages to float freely toward the central drum 228, during the radial expansion of the same, due to the central portion of the cylindrical band being expanded to a diameter greater than the diameter of the bead rings 435. After a time delay provided by the building apparatus control system, to insure the complete mechanical expansion of the central drum 228, the bladders 470 on the auxiliary drums 229 and 230 reinflate, and the cages 233 and 234a converge until the contacts 471 and 484a each engage the aforesaid second ply turn-up stop at which time the ply turn-over operation of the end regions of the cylindrical band is completed, as shown in FIGURE 19. The tire building apparatus control system then causes the bladders 470 to be deflated and actuates the cylinders 267 and 449a to retract the turn-over cages 233 and 234a to their initial inoperative positions. A bead locating and cylindrical band turn-over operation will be carried out in a similar manner on the drum assembly 19 by means of the turn-over cages 234 and 233a.

OPERATION

The operation of the tire building apparatus of the present invention may be illustrated by assuming that bead wires 435 have been installed previously in the bead holders 422, 422a, 450 and 450a, by a second operator who controls the building end portion of the tire building apparatus. The building end portion operator pushes a control button (not shown) to index the building drum assemblies 19 and 20 to the positions shown in FIGURE 1. This indexing of the drums is carried out by means of the previously described structure for reciprocating the turrets 232 and 232a and which generally includes the cylinder 248, cylinder rod 247 and the interconnecting shaft 254. This indexing of the drum assemblies 19 and 20 starts the automatic fabrication of the tire carcass, as explained hereinbefore under the detailed discussion of the various units of the tire building apparatus.

The fabrication of the tire carcass includes the slow rotation of the building drums 228, 229 and 230 of the drum assembly 20, by means of the previously described electric motor 453. The toe strip applicator means 17 then is lowered to engage the drum assembly 20 to apply simultaneously a pair of spaced apart toe strips at positions in the bead ring regions. A toe strip is indicated in FIGURE 18 by the numeral 487. When the toe strip applicating operation has been completed, the toe strip applicator means 17 raises and the conveyor applicator means 18 is raised automatically to engage the bottom surface of the building drum assembly 20 to apply a liner 124 and a pair of plies 65 and 66 over the toe strips.

During the liner and ply applicating operation, the drum assembly 20 is rotated by the motor 452 at a speed higher than that provided by the motor 453 during the toe strip applicating operation. The motor 453 drives the drum assembly 20 at a speed of approximately 12 r.p.m. during the toe strip application. The motor 452 drives the drum assembly 20 at a speed of approximately 280 r.p.m. during a liner and ply application. The pressure applied by the conveyor applicator means 18 is sufficiently to stitch the tire components together as they are applied to the drum assembly 20. When the liner and ply application is completed, the conveyor belt applicator means 18 lowers and the drum assembly 20 stops in a predetermined position. The turn-over cages 233 and 234a start from an inoperative position as illustrated in FIGURE 14, and then are moved inwardly to the intermediate bead locating position, as shown in FIGURE 15, at which point several actions take place in rapid succession as previously described, due to the inflation of the bladders 470.

The bladders 470 on the auxiliary drums 229 and 230 are inflated to engage the cylindrical band formed previously on the drum assembly 20. The turn-over cages 233 and 234a locate the respective bead rings 435 around the end regions of the cylindrical band formed on the drum assembly 20 in concentric radially spaced relationship with the band, and with the bead rings being disposed a predetermined distance apart and in parallel relationship with each other. The initial inflation of the bladders 470 expands or distends the end regions of the cylindrical band on the drum assembly 20 radially outward into adhering engagement with the bead rings to fix the position of the bead rings in relation to the fabric of the cylindrical band. As shown in FIGURE 17, the edges of the cylindrical band are engaged also with the inner surface of the turn-over cages 233 and 234a. The end regions of the cylindrical band thus are distended and turned radially outward. The bladders 470 then begin to deflate partially, and the bead holders 422 and 450a rotate 60° to the inoperative position shown in FIGURES 11 and 17. The bead rings 435 thus are released from the turn-over cages and they are held in place on the cylindrical band due to the inherent tack of the coacting surfaces of the bead rings and the cylindrical band and the radially outwardly directed force exerted on the band and the bead rings by means of the bladders 470.

The expandable central drum 228 is expanded then to its major diameter, as shown in FIGURES 17 and 18. The bladders 470 on the auxiliary drums 229 and 230 then are re-inflated and the turn-over cages 233 and 234a moved inwardly to the position shown in FIGURE 19 to complete the turn-over operation. It will be seen that during the radial expansion of the central drum 228, a central portion of the cylindrical band is expanded to permit simultaneous movement of the end regions of the cylindrical band and the bead rings 435 axially inward toward the ends of the central drum 228 in response to the radial expansion of said cylindrical band central portion. The axial inward movement of the turn-over cages to the position shown in FIGURE 19 turns the end regions of the cylindrical band axially inward about the bead rings to adhere the band end regions to the band to form a tire carcass.

It will be understood that the tire components for a subsequent tire carcass are being prepared by the first operator of the service end portion of the tire building apparatus during the aforedescribed automatic tire carcass fabrication. The bladders 470 deflate while the turn-over cages 233 and 234a move outward automatically to the positions as shown in FIGURE 1, and the tire building apparatus is ready then for indexing the drum assembly 19 into the tire carcass fabricating position. The tire building end portion operator then indexes the apparatus so that the tire building drum assembly 20 is positioned at the right tread applicator station 22 which is shown in FIGURE 1. Simultaneously, the tire building drum assembly 19 is indexed to the common tire carcass building position previously occupied by the drum assembly 20. The drum assemblies 19 and 20 are indexed to these positions by means of the previously described turret rotating structure. The tire building end portion operator then manually applies a tire tread to the tire carcass formed on the drum assembly 20 while a second tire carcass is fabricated automatically on the drum assembly 19.

Figure 21:
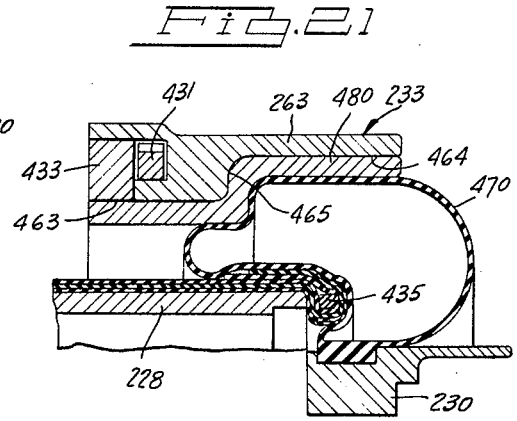
FIGURE 21 is a sectional view similar to FIGURE 19, and showing the apparatus of the present invention processing a bead ring having a diameter smaller than that shown in FIGURE 19.
Figure 20:
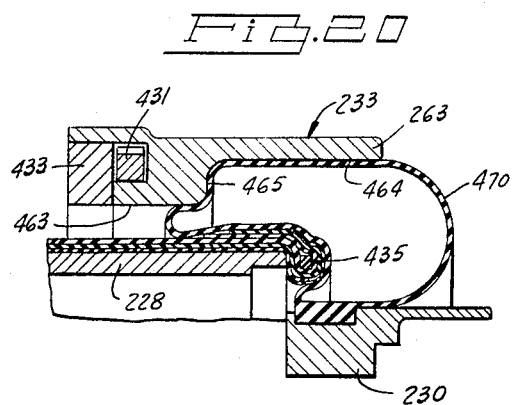
FIGURE 20 is a sectional view similar to FIGURE 19, and showing the apparatus of the present invention processing a bead ring having a diameter larger than that shown in FIGURE 19.

FIGURE 20 illustrates the forming of a tire carcass having a diameter larger than the tire carcass shown in FIGURE 19. In the making of the tire carcass shown in FIGURE 20 the bead ring holders would be rotated on their respective shafts 426 to bring the bead ring gripping portions 423 of the bead ring holders into operative position. FIGURE 21 illustrates the forming of a tire carcass having a smaller diameter than the tire carcass shown in FIGURE 19. In the turn over cage structure shown in FIGURE 21, the shell 263 is provided with a suitable annular liner 480 which is shaped to the same configuration as the inner surface of the cage shell 263. In the making of the tire carcass of FIGURE 21, the bead ring holders would be rotated to bring the bead ring gripping portions 425 into operative position for holding a smaller diameter bead ring.

Figure 22:
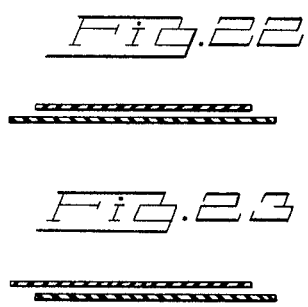
FIGURE 22 is a schematic sectional view illustrating a carcass construction employing two plies of unequal width fabrics.
Figure 25:
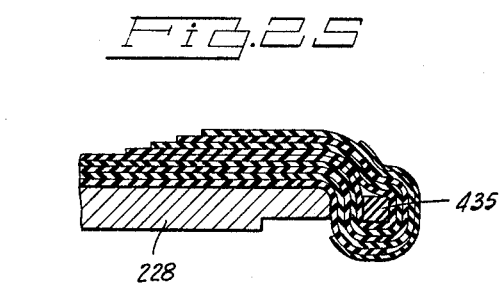
FIGURES 24 and 25 are schematic sectional views illustrating a four-ply stepped carcass construction employing equal width fabrics.
Figure 23:
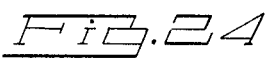
FIGURE 23 is a schematic sectional view illustrating a stepped two-ply carcass construction of equal width fabrics.
Figure 24:
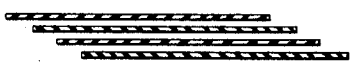
Figure 27:
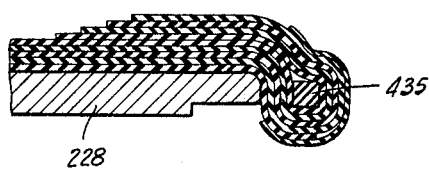
FIGURES 26 and 27 are schematic views illustrating another four-ply carcass construction employing two narrow plies of fabric and two wide plies of fabric.
Figure 26:
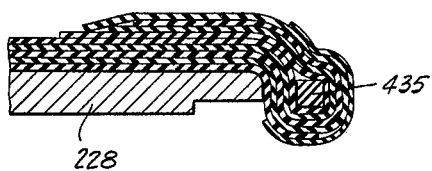

FIGURES 22 through 27 illustrate various multi-ply tire carcasses which may be fabricated with the tire building apparatus of the present invention. FIGURE 22 is a schematic sectional view illustrating a carcass construction employing two plies of unequal width fabrics. FIGURE 23 is a schematic sectional view illustrating a stepped two-ply carcass construction of equal width fabrics. FIGURES 24 and 25 are schematic sectional views illustrating a four-ply stepped carcass construction employing equal width fabrics. FIGURES 26 and 27 are schematic sectional views illustrating another four-ply carcass construction employing two narrow plies of equal width fabrics and two wide plies of equal width fabrics.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What we claim is:
1. The method of forming a tire carcass comprising the steps of:
   (a) forming at least one ply of tire fabric into a cylindrical band having a central portion and bead ring receiving end regions;
   (b) locating a first bead ring around one end region of the cylindrical band and a second bead ring around the other end region of the cylindrical band, in concentric radially spaced apart relationship with said band, with the bead rings being a predetermined distance apart and in parallel, fixed relationship with each other;
   (c) expanding the end regions of said cylindrical band radially outward into adhering engagement with said bead rings to fix the position of said bead rings in relation to said fabric while the central portion of said band remains in a non-expanded condition;
   (d) thereafter radially expanding the central portion of said cylindrical band to form a pair of spaced apart, annular, parallel shoulders therein and to cause simultaneous movement of the end regions of the cylindrical band and the bead rings axially inward toward said shoulders in response to the radial expansion of said band central portion; and,
   (e) turning the end regions of the cylindrical band axially inward about the bead rings to adhere the band end regions to the central portion of the band to form a tire carcass.

2. The method of forming a tire carcass comprising the steps of:
   (a) applying at least one ply of the tire fabric about an expandable cylindrical drum to form a cylindrical band having a central portion and end regions, with the end regions thereof extended axially outward beyond the ends of said drum;
   (b) locating a first bead ring around one end region of the cylindrical band and a second bead ring around the other end region of the cylindrical band, without contacting the drum and in concentric radially spaced apart relationship with said band, with the bead rings being a predetermined distance apart and in parallel, fixed relationship with each other;
   (c) holding the bead rings in said fixed relationship with each other by a positive gripping engagement at the outer peripheries thereof;
   (d) expanding the end regions of said cylindrical band radially outward into the adhering engagement with said bead ring to fix the position of said bead rings in relation to said fabric while the central portion of said band remains in a nonexpanded condition; and thereafter,
   (e) releasing said bead rings from said fixed relationship with each other;
   (f) radially expanding said drum to radially expand the central portion of said cylindrical band and to cause simultaneous movement of the end regions of the cylindrical band and the bead rings axially inward toward the ends of said drum in response to the radial expansion of said band central portion; and,
   (g) turning the end regions of the cylindrical band axially inward about the bead rings to adhere the band end regions to the central portion of the band to form a tire carcass.

3. In the method of forming a tire carcass, wherein said carcass is formed from a cylindrical band of tire fabric having a central portion and end regions, and which band is provided with a bead ring concentrically located over each end region thereof, and at a position inwardly from the adjacent edge of the cylindrical band, wherein the central portion of said cylindrical band is radially expanded, and wherein the end regions of the band are turned axially inward about the bead rings to adhere the band end regions to the central portion of the band after the central portion of the band is expanded, the step of:
   (a) radially distending the end regions of the cylindrical band into adhering engagement with said bead rings before the band central portion is radially expanded, and holding the cylindrical band end regions in a distended condition during the radial expansion of the central portion of the cylindrical band.

4. In the method of forming a tubeless tire carcass on a rotatable building drum assembly which includes a central drum and an auxiliary drum provided with an expandable bladder at each end of the central drum, the steps of:
   (a) placing tire fabric plies in predetermined positions on a first continuous belt conveyor provided with an applicator means;
   (b) placing air impervious tire liners on a second continuous belt conveyor for transfer onto said first conveyor in predetermined positions generally downstream relative to said tire fabric plies on the first conveyor and in partial overlap with one of said plies when the conveyors are actuated;
   (c) moving the applicator means into operative contact with said rotatable drum assembly; and,
   (d) actuating the first and second conveyors and transferring from said applicator means a liner and at least said one of said plies of tire fabric onto the drum assembly to form a tire carcass on the drum assembly while it is rotating, said overlap affording continuity of feed and alignment of said liner and said ply and insuring that the respective splices of said liner and its next adjacent ply are angularly separated in said carcass.

5. In the method of forming automatically a tire carcass on a rotatable tire building drum assembly which includes an expandable central drum and an auxiliary drum provided with an expandable bladder at each end of the expandable central drum, and wherein a cylindrical ply band having a central portion and end regions is formed on the drum assembly, the steps of:
  (a) moving a separate bead ring locating means over each end region of said cylindrical band to locate a bead ring over each end region of the cylindrical band at positions axially outward from the adjacent ends of the expandable central drum and in concentric, radially spaced apart relationship with said band, with the bead rings being a predetermined distance apart and in parallel fixed relationship with each other;
  (b) inflating said bladders radially outward to radially distend the end regions of the cylindrical band into adhering engagement with said bead rings to fix the position of said bead rings in relation to said cylindrical band;
  (c) partially deflating said bladders;
  (d) radially expanding said expandable drum to distend the central portion of said cylindrical band and form a shoulder on each end of said band central portion, and to cause simultaneous movement of the end regions of the cylindrical band and the bead rings axially inward toward said shoulders in response to the radial expansion of said band central portion;
  (e) re-inflating said bladders; and,
  (f) moving the inflated bladders axially inward and over said expandable drum to turn the distended end regions of the cylindrical band about the bead rings to adhere the band end regions to the band to form a tire carcass.

6. In a tire building apparatus, the combination comprising:
  (a) a pair of tire building drum assemblies constructed and arranged for alternate movement between a common first position, at which tire components, including plies and bead rings, are applied to the drum assemblies, and;
  (b) a bias cutter means for providing pieces of tire fabric cut to predetermined widths;
  (c) means adjacent said bias cutter means for receiving said pieces of tire fabric and for splicing additional portions thereto to adjust the lengths thereof to form tire plies;
  (d) conveyor means for conveying said plies to said common first position; and,
  (e) applicator means at said common first position for applying the tire components to the building drum assemblies for forming cylindrical tire bands.

7. In a tire building apparatus, the combination comprising:
  (a) a pair of tire building drum assemblies constructed and arranged for alternate reciprocation between a common first position, at which tire components, including toe strips, liners, plies and bead rings, are applied to the drum assemblies, and;
  (b) a toe strip supply and first applicator means adjacent said drum assembly common first position for applying toe strips to said drum assemblies;
  (c) a bias cutter means for providing pieces of tire fabric cut to predetermined widths;
  (d) means adjacent said bias cutter means for receiving said pieces of tire fabric and for splicing additional portions thereto to adjust the lengths thereof to form tire plies;
  (e) means for supplying, metering and cutting tire liners to predetermined sizes;
  (f) conveyor means for conveying said liners and plies to said drum assembly common first position and having an upstream end for receiving said liners and plies and a downstream end adjacent said drum assembly common first position; and,
  (g) a second applicator means adjacent said drum assembly common first position and coactive with said conveyor means for applying the liners and plies to the building drum assemblies for forming cylindrical tire bands.

8. A tire building apparatus as defined in claim 7, including:
  (a) a ply aligning means disposed in operative relationship with said conveyor means at the upstream end thereof for aligning the plies on the conveyor means in predetermined positions for automatic application onto said drum assemblies.

9. The tire building apparatus as defined in claim 7, wherein each of said tire building drum assemblies includes:
  (a) a turret;
  (b) means pivotally supporting said turret on a vertical axis;
  (c) a tire building drum carried on a shaft horizontal journaled in said turret;
  (d) power means on said turret operatively connected to said tire building drum shaft for rotating the tire building drum;
  (e) an inboard turn-over cage and an outboard turn-over cage operatively mounted on said turret, with the inboard turn-over cage on one turret constructed and arranged to operate with the outboard turn-over cage on the other turret to turn the ends of a cylindrical tire band on said one turret over a pair of bead rings located over the tire band ends; and,
  (f) means for operating said turn-over cages.

10. The tire building apparatus as defined in claim 9, including:
  power means connected to said turrets for simultaneously rotating the turrets carrying said pair of tire building drum assemblies for alternately reciprocating the tire building drum assemblies between said common first position and separate second positions.

11. The tire building apparatus as defined in claim 7, wherein said toe strip applying and first applicator means comprises:
  (a) a frame pivotally mounted above said tire building drum assembly common first position;
  (b) a pair of laterally spaced apart toe strip applicator means carried on said frame;
  (c) a pair of toe strip feed means operatively mounted on said frame for feeding toe strip material to said toe strip applicator means;
  (d) a pair of cutting means on said frame for cutting the toe strips to length; and,
  (e) power means connected to said frame for lowering and raising said frame to move said toe strip applicator means between operative and inoperative positions.

12. The tire building apparatus as defined in claim 7, wherein said means for supplying, metering and cutting tire liners to predetermined size comprises:
  (a) means for storing rolls of tire liner material;
  (b) means for unrolling said tire liner material;
  (c) power cutter means for trimming the edges of the tire liner material after it has been unrolled;
  (d) an inclined conveyor for receiving the trimmed tire liner material and depositing it on said first mentioned conveyor means;

(e) means for cutting the trimmed tire liner material to provide tire liners cut to the proper length; and,
(f) power means connected to said means for unrolling the tire liner material and the inclined conveyor for actuating the same.

13. A tire building apparatus as defined in claim 12, wherein:
(a) said inclined conveyor is disposed in vertical alignment over said first mentioned conveyor means with the upstream end of the inclined conveyor being at a higher level than the downstream end thereof; and,
(b) the downstream end of said inclined conveyor being disposed immediately above said first mentioned conveyor means for transferring the liners from said inclined conveyor to said first mentioned conveyor means in a predetermined order.

14. In a tire building apparatus which is provided with a conveyor means for conveying tire plies to a tire building drum assembly position, the combination comprising:
(a) a tire ply aligning means disposed in operative relationship with said conveyor means for aligning the plies on the conveyor means in predetermined positions for automatic application onto a tire building drum assembly;
(b) said ply aligning means including a gauge rail disposed over said conveyor means for engagement by the plies to align them on the conveyor means;
(c) an adaptor plate movably mounted on a supporting structure;
(d) means hingedly mounting said gauge rail on said adaptor plate; and,
(e) power means engageable with the adaptor plate for selectively moving said adaptor plate to position said gauge rail in a predetermined position over said conveyor means.

15. In a tire building apparatus which is provided with an endless belt conveyor for conveying tire plies to a tire building drum, a tire ply aligning means disposed in operative relationship with said belt conveyor for aligning the plies on the belt conveyor in predetermined positions for automatic application onto the tire building drum, comprising:
(a) an elongated ply gauge rail disposed over said belt conveyor and extended longitudinally thereof, and adapted for abutting engagement with a tire ply placed on the belt conveyor;
(b) a support member mounted on the conveyor;
(c) an adaptor plate movably mounted on said support member;
(d) said gauge rail being mounted swingably on said adaptor plate;
(e) a pair of spaced apart bearing plates fixed on said adaptor plate; and
(f) power means operatively supported between said bearing plates to engage selectively said bearing plates to move said adaptor plate and position said gauge rail in a predetermined transverse position over said belt conveyor.

16. The tire building apparatus as defined in claim 15, wherein:
(a) said power means for moving said adaptor plate comprises a power cylinder adapted for engagement selectively with one of said bearing plates to move the adaptor plate and gauge plate toward one side of the conveyor, and a plurality of power cylinders adapted for engagement selectively with the other of said bearing plates to move the adaptor plate and gauge plate toward the other side of the conveyor.

17. In a tire building apparatus which is provided with a rotatable tire building drum, a toe strip applicator means for applying a pair of toe strips to the tire building drum, comprising:
(a) a support structure;
(b) a frame pivotally mounted on said support structure adjacent said tire building drum;
(c) a pair of laterally spaced apart toe strip applicators operatively mounted on said frame;
(d) a pair of toe strip feed means operatively mounted on said frame for feeding toe strip material to said toe strip applicators;
(e) a pair of cutting means operatively mounted on said frame for cutting the toe strip material after a predetermined length of the same has been applied to the tire building drum; and
(f) power means connected to said frame for pivoting said frame to move said toe strip applicators into and out of operative engagement with said tire building drum.

18. In a tire building apparatus which is provided with a rotatable tire building drum, a toe strip applicator means for automatically applying a pair of toe strips to the tire building drum, comprising:
(a) a support structure;
(b) a frame pivotally mounted on said support structures adjacent said tire building drum;
(c) a pair of laterally spaced apart carriages adjustably mounted on said frame;
(d) a toe strip applicator operatively mounted on each carriage;
(e) a power operated slide assembly operatively mounted on each carriage;
(f) a toe strip feed means operatively mounted on each slide assembly for feeding toe strip material to the toe strip applicator on the carriage;
(g) a power operated cutter means operatively mounted on each carriage for cutting the toe strip material after a predetermined length of the same has been applied to the tire building drum; and,
(h) power means connected to said frame for pivoting said frame to move said toe strip applicators into and out of operative engagement with said tire building drum.

19. The tire building apparatus as defined in claim 18, wherein each of said toe strip applicators includes:
(a) a rotatably mounted sleeve adapted for supporting and rolling engagement with the toe strip material to guide and apply the toe strip material on the building drum during a toe strip applicator operation; and
(b) said sleeve is perforated and is provided with vacuum means for maintaining the toe strip material in contact with the sleeve.

20. In a tire building apparatus wherein tire plies and tire liners are applied to a tire building drum by conveyor applicator means, means for supplying, metering and cutting tire liners to predetermined sizes comprising:
(a) a support structure;
(b) means mounted on said support structure for rollably supporting at least one roll of tire liner material;
(c) means mounted on said support structure for unrolling said tire liner material;
(d) power operated dual trim cutter means disposed adjacent said unrolling means for trimming the side edges of the unrolled tire liner material;
(e) an inclined conveyor mounted on said support structure for receiving the trimmed tire liner material from said edge trimming means;
(f) means operatively mounted on said inclined conveyor for cutting the tire liner material to provide tire liners cut to predetermined lengths; and,
(g) power means operatively connected to said unrolling means and inclined conveyor for actuating the same.

21. The tire building apparatus as defined in claim 25, wherein said means for cutting the tire material to length comprises:
(a) detecting means operatively mounted along the inclined conveyor for detecting the leading end of the trimmed tire liner material and for controlling said power means to stop the actuation of said unrolling means and inclined conveyor; and, (b) a power operated length cutter means operatively mounted over the inclined conveyor and being disposed a predetermined distance away from said detecting means and operative to cut the tire liner material when the inclined conveyor is stopped by the operation of said detecting means to cut a tire liner to a predetermined length.

22. A tire building apparatus as defined in claim 21, wherein:
(a) said inclined conveyor is operable to transfer the cut-to-length tire liner to said conveyor applicator means; and,
(b) said inclined conveyor is provided with an electrostatic means for electrostatically charging the trailing end of the cut-to-length tire liner during the transfer of the same to said conveyor applicator means.

23. In a tire building apparatus wherein tire plies and tire liners are automatically applied to a tire building drum by conveyor applicator means, means for supplying, metering and cutting tire liners to predetermined sizes comprising:
(a) a support structure;
(b) at least one roller rotatably mounted on said support structure for rollably supporting a roll of tire liner material;
(c) an arm swingably mounted on said support structure for carrying a take-up roll for rolling up the tire liner separating material as the tire liner material is unrolled from said first mentioned roller;
(d) power operated means for swinging said swingably mounted arm upwardly and downwardly;
(e) a horizontally disposed endless belt conveyor mounted on said support structure for unrolling the tire liner material from said first mentioned roller; and,
(f) power means mounted on said support structure and operatively connected to said horizontal conveyor and said take-up roll for driving the same during a tire liner material unrolling operation.

24. The tire building apparatus as defined in claim 28, including:
(a) a pair of laterally spaced apart power operated cutter mechanisms operatively mounted on said support structure for trimming the edges of the unrolled tire liner material;
(b) roller guide means mounted on said support structure for guiding the unrolled tire liner material from said horizontal conveyor to said cutter mechanisms; and,
(c) means for adjusting the spacing of said cutter mechanisms.

25. The tire building apparatus as defined in claim 24, including:
(a) an inclined endless belt conveyor operatively mounted on said support structure and disposed with the upstream end thereof beneath said cutter mechanisms and at a level higher than the downstream end thereof, and being adapted to receive the trimmed tire liner material; and,
(b) means drivingly connecting said power means to said inclined conveyor for selective actuation of the same.

26. In a tire building apparatus provided with means for applying plies and bead rings to a tire building drum to form a tire carcass, the combination, comprising:
(a) a pair of laterally spaced apart tire building drum assemblies constructed and arranged for alternate movement between a common first position, at which tire components, including plies and bead rings, are applied to the drum assemblies, and separate second positions,
(b) said pair of drum assemblies including a left building drum assembly and a right building drum assembly;
(c) each of said tire building drum assemblies including a turret;
(d) means pivotally supporting said turret on a vertical axis;
(e) a tire building drum carried on a shaft journaled in said turret;
(f) power means on said turret operatively connected to said shaft for selective rotation of the tire building drum;
(g) an inboard turn-over cage operatively mounted on said turret in co-axial alignment with said tire building drum for co-axial movement thereover;
(h) an outboard turn-over cage operatively mounted on said turret in a position angularly spaced from said inboard turn-over cage; and,
(i) means for operating said turn-over cages.

27. The tire building apparatus as defined in claim 26, wherein:
(a) the outboard turnover cage on each turret is operatively mounted thereon in a position angularly spaced 90° from the inboard cage thereon;
(b) the outboard turn-over cage on the left drum assembly is co-axially aligned with the building drum on the right drum assembly when the right building drum assembly is in said common first position; and,
(c) the outboard turn-over cage on the right drum assembly is co-axially aligned with the building drum on the left drum assembly when the left building drum assembly is in said common first position.

28. The tire building apparatus as defined in claim 27, including:
(a) power means for simultaneously rotating the turrets carrying said pair of tire building drum assemblies for alternately reciprocating the tire building drum assemblies between said common first position and separate second positions.

29. The tire building apparatus as defined in claim 28, including:
(a) a toe strip supply and applicator means adjacent said drum assembly common first position for applying toe strips to said drum assemblies.

30. The tire building apparatus as defined in claim 29, including:
(a) means for supplying, metering and cutting tire liners to predetermined sizes;
(b) conveyor means for conveying liners and plies to said common first drum assembly position; and,
(c) a second applicator means for applying the liners and plies to the building drum assemblies for forming cylindrical tire bands.

31. In a tire building apparatus which is provided with bias cutter means for providing pieces of tire fabric cut to predetermined widths, means for receiving said pieces of tire fabric and for splicing additional portions thereto to adjust the length thereof to form tire plies for deposit on a conveyor means for further processing, comprising:
(a) an inclined table disposed at the front end of said bias cutter means for receiving the pieces of tire fabric from the bias cutter means;
(b) an inclined splicing platform disposed above the conveyor means adjacent one end of said inclined table and in alignment therewith for splicing pieces of fabric to form tire plies; and
(c) power means for retracting said splicing platform to permit transfer of the plies at said one end of the inclined table to the conveyor means.

32. The method of forming a tire carcass comprising the steps of:
(a) forming at least one ply of tire fabric into a cylindrical band having a central portion and bead ring receiving end regions;
(b) locating a first bead ring around one end region of the cylindrical band and a second bead ring around the other end region of the cylindrical band, in concentric radially spaced apart relationship with said band, with the bead rings being a predetermined distance apart and in parallel, fixed relationship with each other;

(c) expanding the end regions of said cylindrical band radially outward into adhering engagement with said bead rings to fix the position of said bead rings in relation to said fabric while the central portion of said band remains in a non-expanded condition;

(d) thereafter radially expanding the central portion of said cylindrical band to form a pair of spaced apart, annular shoulders therein; and, (e) turning the end regions of the cylindrical band axially inward about the bead rings to adhere the band end regions to the central portion of the band to form a tire carcass.

33. In a tire building apparatus, the combination comprising:

(a) a pair of tire building drum assemblies constructed and arranged for alternate movement between a common first position and separate second positions, tire components, including plies and bead rings, being applied to the drum assemblies at said common first position, said drum assemblies being moved to said separate second positions prior to the application of tire treads thereto;

(b) a bias cutter means for providing pieces of tire fabric cut to predetermined widths;

(c) means adjacent said bias cutter means for receiving said pieces of tire fabric and for splicing additional portions thereto to adjust the lengths thereof to form tire plies;

(d) conveyor means for conveying said plies to said common first position; and, (e) applicator means at said common first position for applying the tire components to the building drum assemblies for forming cylindrical tire bands.

34. In a tire building apparatus, the combination comprising:

(a) a pair of tire building drum assemblies constructed and arranged for alternate movement between a common first position, at which tire components, including plies and bead rings, are applied to the drum assemblies, and separate second positions, at which tire tread is applied to the tire components previously mounted on the drum assemblies at said common first position;

(b) a bias cutter means for providing pieces of tire fabric cut to predetermined widths;

(c) means adjacent said bias cutter means for receiving and storing said pieces of tire fabric and for splicing additional portions thereto to adjust the lengths thereof to form tire plies;

(d) conveyor means for conveying said plies to said common first position; and (e) applicator means at said common first position for applying the tire components to the building drum assemblies for forming cylindrical tire bands.

35. In a tire building apparatus, the combination comprising:

(a) a pair of tire building drum assemblies constructed and arranged for alternate movement between a common first position and separate second positions, tire components, including toe strips, liners, plies and bead rings, being applied to the drum assemblies at said common first position, said drum assemblies being moved to said separate second positions prior to the application of tire treads thereto;

(b) a toe strip supply and first applicator means adjacent said common first position for applying toe strips to said drum assemblies;

(c) a bias cutter means for providing pieces of tire fabric cut to predetermined widths;

(d) means adjacent said bias cutter means for receiving and storing said pieces of tire fabric and for splicing additional portions thereto to adjust the lengths thereof to form tire plies;

(e) means for supplying, metering and cutting tire liners to predetermined sizes;

(f) conveyor means for conveying said liners and plies to said common first position and having an upstream end for receiving said liners and plies and a downstream end adjacent said common first position; and, (g) a second applicator means adjacent said common first position and coactive with said conveyor means for applying the liners and plies to the building drum assemblies for forming cylindrical tire bands.

36. In a tire building apparatus, the combination comprising:

(a) a pair of tire building drum assemblies constructed and arranged for alternate reciprocation between a common first position, at which tire components, including toe strips, liners, plies and bead rings, are applied to the drum assemblies, and separate second positions, at which tire tread is applied to the tire components previously mounted on the drum assemblies at said common first position;

(b) a toe strip supply and first applicator means adjacent said common first position for applying toe strips to said drum assemblies;

(c) a bias cutter means for providing pieces of tire fabric cut to predetermined widths;

(d) means adjacent said bias cutter means for receiving and storing said pieces of tire fabric and for splicing additional portions thereto to adjust the lengths thereof to form tire plies;

(e) means for supplying, metering and cutting tire liners to predetermined sizes;

(f) conveyor means for conveying said liners and plies to said common first position and having an upstream end for receiving said liners and plies and a downstream end adjacent said common first position; and (g) a second applicator means adjacent said common first position and coactive with said conveyor means for applying the liners and plies to the building drum assemblies for forming cylindrical tire bands.

37. In a tire building apparatus provided with means for applying plies and bead rings to a tire building drum to form a tire carcass, the combination, comprising:

(a) a pair of laterally spaced apart tire building drum assemblies constructed and arranged for alternate movement between a common first position and separate second positions, tire components, including plies and bead rings, being applied to the drum assemblies at said common first position, said drum assemblies being moved to said separate second positions prior to the application of tire treads thereto;

(b) said pair of drum assemblies including a left building drum assembly and a right building drum assembly;

(c) each of said tire building drum assemblies including a turret;

(d) means pivotally supporting said turret on a vertical axis;

(e) a tire building drum carried on a shaft journaled in said turret;

(f) power means on said turret operatively connected to said shaft for selective rotation of the tire building drum;

(g) an inboard turn-over cage operatively mounted on said turret in co-axial alignment with said tire building drum for co-axial movement thereover;

(h) an outboard turn-over cage operatively mounted on said turret in a position angularly spaced from said inboard turn-over cage; and, (i) means for operating said turn-over cages.

38. In a tire building apparatus provided with means for applying plies and bead rings to a tire building drum to form a tire carcass, the combination, comprising:
- (a) a pair of laterally spaced apart tire building drum assemblies constructed and arranged for alternate movement between a common first position, at which tire components, including plies and bead rings, are applied to the drum assemblies, and separate second positions, at which tire tread is applied to the tire components previously mounted on the drum assemblies at said common first position;
- (b) said pair of drum assemblies including a left building drum assembly and a right building drum assembly;
- (c) each of said tire building drum assemblies including a turret;
- (d) means pivotally supporting said turret on a vertical axis;
- (e) a tire building drum carried on a shaft journaled in said turret;
- (f) power means on said turret operatively connected to said shaft for selective rotation of the tire building drum;
- (g) an inboard turn-over cage operatively mounted on said turret in co-axial alignment with said tire building drum for co-axial movement thereover;
- (h) an outboard turn-over cage operatively mounted on said turret in a position angularly spaced from said inboard turn-over cage; and,
- (i) means for operating said turn-over cages.

References Cited

UNITED STATES PATENTS

| | | | |
|---|---|---|---|
| 3,216,879 | 11/1965 | Mallory et al. | 156—406 |
| 3,237,199 | 2/1966 | Brey | 156—398 |
| 3,265,549 | 8/1966 | Woodhall et al. | 156—131 |
| 3,268,382 | 8/1966 | Urbon | 156—412 |
| 1,925,894 | 9/1953 | Barder et al. | 156—133 X |
| 2,319,643 | 5/1943 | Sternad et al. | 156—398 X |
| 2,407,152 | 9/1946 | Haase | 156—132 X |
| 2,441,791 | 5/1948 | Bostwick | 156—406 X |
| 2,918,105 | 12/1959 | Harris | 156—406 X |
| 2,962,083 | 11/1960 | Hasselquist | 156—504 X |
| 3,071,179 | 1/1963 | Tourtellote et al. | 156—405 |
| 3,081,959 | 3/1963 | Goodwin | 156—405 X |
| 3,162,562 | 12/1964 | Wenger et al. | 156—406 |
| 3,170,829 | 2/1965 | Batten | 156—405 |
| 3,171,769 | 3/1965 | Henley et al. | 156—401 X |

FOREIGN PATENTS 628,998 10/1961 Canada.

HAROLD ANSHER, Primary Examiner

C. B. COSBY, Assistant Examiner

U.S. Cl. X.R.

156—123, 132, 396, 401, 405, 416

PO-1050
(5/69)

UNITED STATES PATENT OFFICE
CERTIFICATE OF CORRECTION

Patent No. 3,479,238  Dated November 18, 1969

Inventor(s) N. T. KEHOE et al

It is certified that error appears in the above-identified patent and that said Letters Patent are hereby corrected as shown below:

Column 13, line 30, the numeral "75" should read --74--. Column 14, line 50, the numeral "3" should read --33--. Column 20, line 40, the numeral "10" should read --20--. Column 21, line 59, the word "to" should read --toe--. Column 22, line 36, after the word "to" insert the word --the--. Column 28, line 1, the numeral "473a" should read --472a--. Column 29, line 26, word "over" should read --up--; line 55, after the word "bead", insert the word --ring--. Column 30, line 15, the word "sufficiently" should read --sufficient--. Column 32, line 23, delete the word "the"; line 24, the word "ring" should read --rings--; line 27, insert a comma (,) after the word "and". Column 33, line 49, after the word "and" and before the semicolon (;), insert the phrase --separate second positions--; line 67, after the word "and" and before the semi-colon (;), insert the phrase --separate second positions--. Column 34, line 28, the phrase "shaft horizontal" should read --horizontal shaft--; line 67, the word "size" should read --sizes--. Column 36, line 9, inse a comma (,) after the word "and"; lines 19 and 20, the word "structures" should read --structure--; line 43, insert a comma (,) after the word "and"; line 68, the claim reference numeral "25" should read --20--. Column 37, line 41, the claim referen numeral "28" should read --23--; line 72, the comma (,) after the word "positions" should be a semi-colon (;).

SIGNED AND
SEALED
JUN 16 1970

(SEAL)
Attest:

Edward M. Fletcher, Jr.
Attesting Officer

WILLIAM E. SCHUYLER, JR.
Commissioner of Patents